United States Patent
Mufti

(10) Patent No.: US 11,082,455 B2
(45) Date of Patent: Aug. 3, 2021

(54) NETWORK GATEWAY TRANSCODER-UTILIZATION-AWARE SESSION CONTROL

(71) Applicant: T-Mobile USA, Inc., Bellevue, WA (US)

(72) Inventor: Shujaur Mufti, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 92 days.

(21) Appl. No.: 15/585,725

(22) Filed: May 3, 2017

(65) Prior Publication Data

US 2018/0324235 A1 Nov. 8, 2018

(51) Int. Cl.
*H04L 29/06* (2006.01)

(52) U.S. Cl.
CPC ........ *H04L 65/1006* (2013.01); *H04L 65/103* (2013.01); *H04L 65/1083* (2013.01); *H04L 65/605* (2013.01)

(58) Field of Classification Search
CPC ............. H04L 65/1006; H04L 65/1083; H04L 65/103; H04L 65/605; H04L 65/1069; H04L 65/1016; H04L 65/1013; H04L 65/102; H04L 65/1023; H04L 65/1026; H04L 65/104; H04L 65/1046; H04L 65/1066; H04L 12/66; H04L 45/22; H04L 67/141; H04L 69/08
See application file for complete search history.

(56) References Cited

U.S. PATENT DOCUMENTS

| | | | | |
|---|---|---|---|---|
| 7,751,359 B1* | 7/2010 | Bienn | ................. | H04L 65/1006 370/328 |
| 8,199,727 B1* | 6/2012 | Bienn | ................. | H04M 7/0072 370/335 |
| 8,254,930 B1 | 8/2012 | Mauer et al. | | |
| 8,477,730 B2* | 7/2013 | Rajagopalan | ......... | H04W 36/22 370/331 |
| 9,705,993 B1* | 7/2017 | Asghari | .............. | H04L 65/1006 |

(Continued)

OTHER PUBLICATIONS

"Asterisk SIP Media Path", retrieved Mar. 14, 2017, from <<https://www.voip-info.org/wiki/view/Asterisk+SIP+media+path>>, 4 pages.

(Continued)

*Primary Examiner* — Alina A Boutah
(74) *Attorney, Agent, or Firm* — Lee & Hayes, P.C.

(57) ABSTRACT

Some examples herein can permit increasing the number of concurrent sessions that a network can support. An anchoring network device can anchor the sessions. A network gateway can transcode data of those sessions using transcoding units, and determine a utilization of the transcoding units. The anchoring network device can determine that the utilization satisfies a load criterion. The anchoring network device can adjust capability information of at least one session to reduce load on the network gateway. In some examples, the anchoring network device can send a session-change message to terminal(s) of session(s). In some examples, the anchoring network device can remove a relatively high-load codec from a codec list of a session. In some examples, the anchoring network device can adjust capability information based on predicted load.

20 Claims, 14 Drawing Sheets

(56) References Cited

U.S. PATENT DOCUMENTS

| | | | |
|---|---|---|---|
| 2003/0200337 A1* | 10/2003 | Jabri | H04L 29/06 709/246 |
| 2005/0060411 A1* | 3/2005 | Coulombe | H04L 69/24 709/227 |
| 2006/0291483 A1 | 12/2006 | Sela | |
| 2007/0043558 A1* | 2/2007 | Schwarz | H04L 47/824 704/207 |
| 2007/0171841 A1* | 7/2007 | Witzel | H04L 65/103 370/254 |
| 2009/0154658 A1* | 6/2009 | Kasper | H04M 7/0072 379/32.01 |
| 2011/0255530 A1 | 10/2011 | Chaturvedi et al. | |
| 2012/0185600 A1* | 7/2012 | Belling | H04L 45/00 709/227 |
| 2015/0016421 A1 | 1/2015 | Chaturvedi et al. | |
| 2015/0236905 A1* | 8/2015 | Bellan | H04L 67/141 709/222 |
| 2015/0319648 A1 | 11/2015 | Shatsky | |
| 2016/0072868 A1* | 3/2016 | Poulin | H04L 65/605 709/219 |
| 2016/0105468 A1* | 4/2016 | Mufti | H04L 65/1069 709/228 |
| 2016/0226785 A1* | 8/2016 | Khay-Ibbat | H04L 65/602 |
| 2016/0285943 A1* | 9/2016 | Su | H04L 65/607 |
| 2016/0381229 A1* | 12/2016 | Singh | H04L 65/605 370/259 |
| 2017/0026878 A1 | 1/2017 | Hori | |
| 2017/0054764 A1 | 2/2017 | Sharma et al. | |
| 2018/0139254 A1* | 5/2018 | Oyman | H04L 67/2842 |
| 2018/0176266 A1* | 6/2018 | Filart | H04L 65/605 |

OTHER PUBLICATIONS

Camarillo, G. et al., "Re-INVITE and Target-Refresh Request Handling in the Session Initiation Protocol (SIP)", Internet Engineering Task Force (IETF), Request for Comments: 6141, Mar. 2011, pp. 3-8, 12-14 and 21.

"Cisco Collaboration System 10.x Solution Reference Network Designs (SRND)" Cisco, Jan. 19, 2016, 54 pages.

"H.248", Wikipedia, retrieved Jul. 14, 2017, from <<https://en.wikipedia.org/wiki/H.248>>, 6 pages.

"High-Density Packet Voice Digital Signal Processor Module for Cisco Unified Communications Solutions", Cisco, Aug. 19, 2014, 6 pages.

Khan, M., "WebRTC Signaling Concepts", retrieved Mar. 14, 2017, from <<https://www.webrtc-experiment.com/docs/WebRTC-Signaling-Concepts.html>>, 16 pages.

Rosenberg, J., et al., "An Offer/Answer Model with the Session Description Protocol (SDP)", Network Working Group, Request for Comments: 3264, Jun. 2002, 25 pages.

Rosenberg, J. et al., "SIP: Session Initiation Protocol", Network Working Group, Request for Comments: 3261, Jun. 2002, pp. 16 and 86-89.

Rosenberg, J. et al., "The Session Initiation Protocol (SIP) UPDATE Method", Network Working Group, Request for Comments: 3311, Sep. 2002, pp. 2-7 and 10.

Series H: Audiovisual and Multimedia Systems, International Telecommunication Union, H.248.1, Mar. 2013, pp. iii-v, 1, 4-10, 15, 19-29, 40-41, 60-61, 68-69, 119-120, 170-171, 194-201.

"SIP Mid Call Codec Re-Negotiation", Genesys Buru Blog, Apr. 1, 2013, retrieved Mar. 14, 2017, from <<http://genesysguru.com/blog/blog/2013/04/01/mid-call-codec-re-negotiation/>>, 3 pages.

"WebRTC", Wikipedia, retrieved May 30, 2017, from <<https://en.wikipedia.org/wiki/WebRTC>>, 5 pages.

"WebRTC Gateway", Wikipedia, retrieved Jul. 14, 2017, from <<https://en.wikipedia.org/wiki/WebRTC_Gateway>>, 3 pages.

"WebRTC GW", Real Time Communication, retrieved Jul. 14, 2017, from <<https://realtimecommunication.wordpress.com/2015/06/04/webrtc-gw/ >>, 10 pages.

The PCT Search Report and Written Opinion dated Jul. 30, 2018, for PCT Application No. PCT/US18/27496, 11 pages.

Extended European Search Report from the European Patent Office for Application No. 18794646.2, dated Dec. 4, 2020, a counterpart foreign application of U.S. Appl. No. 15/585,725, 14 pages.

* cited by examiner

NETWORK GATEWAY TRANSCODER-UTILIZATION-AWARE SESSION CONTROL

BACKGROUND

A computing device configured for telecommunications, such as a wireless phone, is generally capable of processing various types and encodings of media. However, not all telecommunications devices connectable via a particular network necessarily support the same types or encodings. This can restrict users' ability to communicate with other users having different types of telecommunications devices. Moreover, communication restrictions may vary over time depending on the condition of the network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items. The figures are not necessarily to scale.

For brevity of illustration, in the diagrams herein, an arrow beginning with a diamond connects a first component or operation (at the diamond end) to at least one second component or operation that is or can be included in the first component or operation in at least one example.

DETAILED DESCRIPTION

Overview

Figure 1:
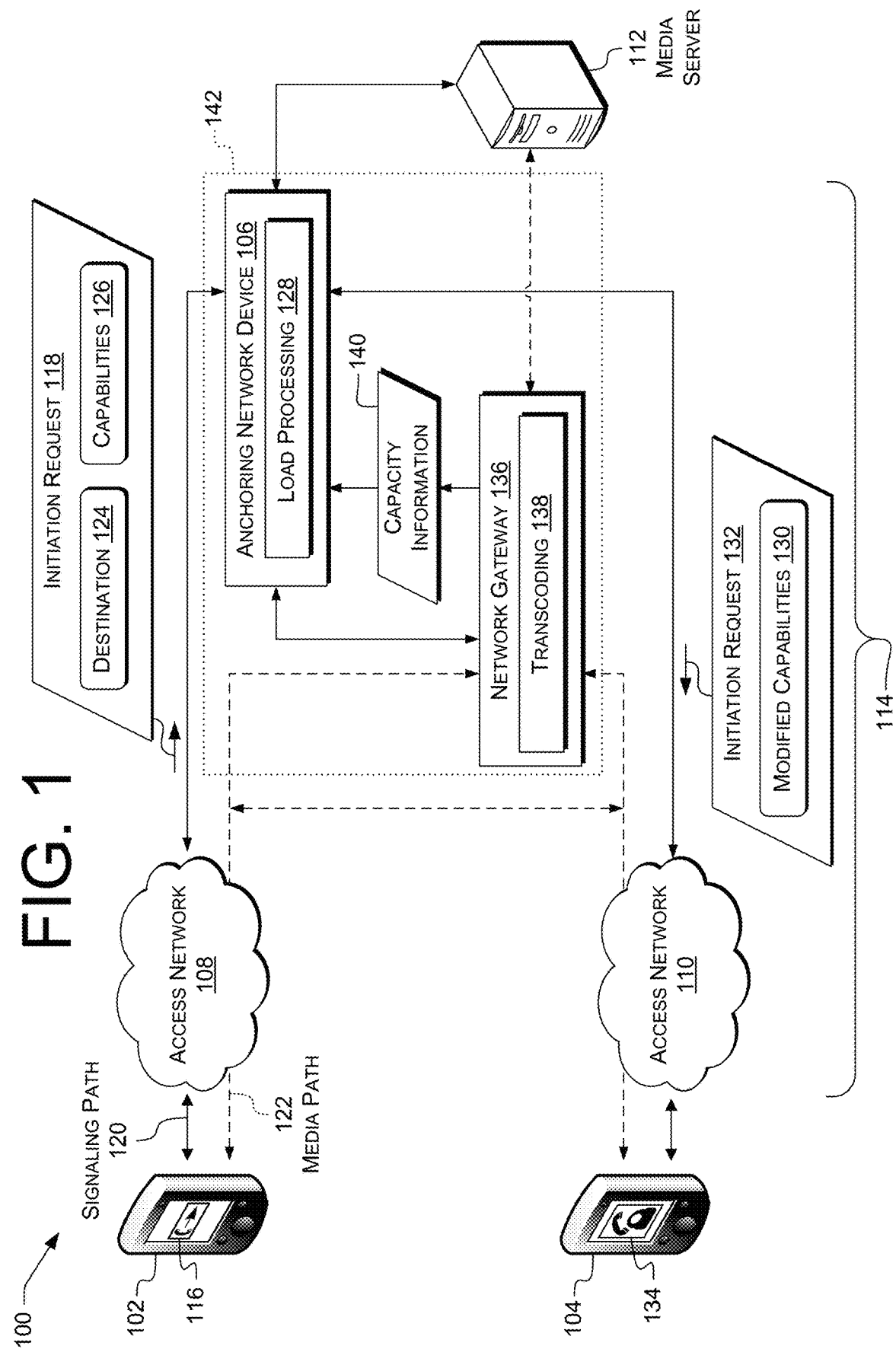
FIG. 1 is a block diagram illustrating a telecommunication system for implementing capability-information modification for transcoder-load management according to some implementations.

Digitized voice or other audio, or digitized video, can be encoded with a variety of coding/decoding procedures, or "codecs." Audio or video communications between terminals with different codec capabilities may require transcoding or specific codec selection. In some prior schemes, a destination terminal such as a mobile terminating (MT) device can only select from among codecs or modes offered by an origin terminal (e.g., a mobile originating, MO, device). This can be a significant limitation, given the wide variety of codecs supported by different terminals. Therefore, some prior schemes include core network devices, e.g., media gateways (MGWs) configured to transcode data of a session between one codec and another in a codec pair, thus permitting intercommunication between terminals.

However, an MGW can only transcode data of a particular session between codecs supported by the terminals in that session. Therefore, the numbers and types of codec pairs being transcode change over time, as sessions are established and torn down and as terminals connect and disconnect. Moreover, different codec pairs place different amounts of load on a core network device. Consequently, the load on a media gateway depends not only on the number of sessions it is handling but also on the specific codec pairs being transcoded in each session.

Media gateways have a limited transcoding capacity, e.g., measured in terms of processor cycles, digital signal processor (DSP) cores, or hardware or firmware processing units. When a media gateway reaches its transcoding capacity, existing or new sessions may be dropped without warning. This can result in unexpected, unpredictable termination of sessions, and consequent reduced network reliability.

In some examples described herein, as the transcoding load of a media gateway rises, the gateway downgrades existing sessions to lower-load codec pairs to increase the number of sessions the gateway can handle. This can delay the onset of session dropping, increasing the capacity of the network. This can also provide an early warning of increasing load, permitting the core network to take other action to reduce the load before calls drop. Example techniques herein can be used for two-way voice or video sessions, such as LTE or WebRTC sessions. Example techniques herein can additionally or alternatively be used for one-way streaming sessions, such as video or music streaming. Example techniques herein can be performed transparently to the intercommunicating terminals, thus permitting increasing network capacity even with existing terminals. Example systems and techniques herein can permit terminals having certain capabilities to communicate with terminals not having those capabilities, e.g., without requiring computationally-expensive transcoding or other manipulation of the payloads of packets of the session.

Example audio codecs can include pulse-code modulation (PCM), μ-law PCM (PCMU), or G.711, e.g., as used in the public switched telephone network (PSTN); Opus, Vorbis, MP3, Advanced Audio Coding (AAC), or other codecs commonly used in the personal-computing environment; International Telecommunications Union (ITU) G.729 or other codecs used in videoconferencing; or adaptive multirate (AMR), Enhanced Voice Services (EVS), or other codecs commonly used in cellular systems. Example video codecs can include ITU H.263, Moving Picture Experts Group (MPEG) standards such as MPEG-4 part 2 and H.264/MPEG-4 part 10; codecs such as Theora, QUICKTIME, VP6, VP8, and other codecs commonly used in personal computer (PC) environments; or H.261, MPEG-1, or MPEG-2 in older PCs or telecommunication systems. Example lossless codecs can include deflate, run-length encoded (RLE), or Lempel-Ziv-Markov chain algorithm (LZMA). The listed codecs are not limiting, and examples herein can additionally or alternatively use other codecs.

As used herein, a "terminal" is a communication device, e.g., a cellular telephone or other user equipment (UE), configured to perform, or intercommunicate with systems configured to perform, techniques described herein. Terminals can include, e.g., wireless voice- or data-communication devices. A terminal can include a user interface (e.g., as does a smartphone), but is not required to. For example, a streaming server configured to provide audio or visual content on demand can be a terminal. Such a terminal may not include a user interface, instead relying on interfaces at other terminals to form queries and send those queries to the server.

As used herein, the terms "capabilities" and "media capabilities" refer to data types, encodings, formats, bit rates, protocols, underlying protocols, compression techniques, profiles, signal-integrity techniques such as error-detection or error-correction techniques, codecs, or combinations of any of those, that are supported by a terminal for the exchange of data with other terminals. The term "session" as used herein includes a communications path for uni- or bi-directional exchange of data among two or more terminals. Example sessions include voice and video calls, e.g., by which human beings converse, a data communication session, e.g., between two electronic systems or between an electronic system and a human being, or a Rich Communication Services (RCS) session. An example of a session can be, e.g., a voice-over-Internet Protocol (IP), or "VoIP," call from a Web browser or tablet application using Opus via a WebRTC gateway to an IP Multimedia Subsystem (IMS) subscriber, or vice versa. A WebRTC gateway, in some examples, can convert between SIP and other signaling protocols. A WebRTC gateway, in some examples, can additionally or alternatively transcode between codecs.

The term "packet" is used herein to refer generally to data packets, frames, datagrams, or any other identifiable units of data that include a header and a payload and that are transmitted or received via a communication network. Throughout this document, discussions of transmissions, e.g., of packets, from specified origins or to specified destinations can include any number, zero or more, of intervening network devices, unless otherwise expressly specified.

Many networks are "heterogeneous networks," i.e., networks including terminals with various sets of capabilities. For example, many LTE cellular networks support voice over LTE (VoLTE) and also interconnect with the PSTN. Voice calls using VoLTE may be encoded or decoded using any one of a variety of codecs, e.g., an AMR codec or an EVS codec. Wideband AMR (AMR-WB), for example, encodes audio data in the frequency range of approximately 50 Hz-7000 Hz into compressed data at bit rates between, e.g., 6.6 kbps and 23.85 kbps, e.g., 12.65 kbps. Another example of a codec is narrowband AMR (AMR-NB), which encodes audio data in the frequency range of approximately 200 Hz-3400 Hz. The EVS codec encodes 16-bit linear pulse code modulated (PCM) audio samples covering frequency ranges up to 16 kHz (super wideband, SWB) or up to 20 kHz (full-band, FB) at sampling rates of 8 kHz, 16 kHz, 32 kHz, or 48 kHz. Compressed EVS data can have bit rates between 5.9 kbit/s and 128 kbit/s, or between 6.6 kbit/s and 23.85 kbit/s for interoperability with AMR-WB. The PSTN generally carries uncompressed audio in the 300 Hz-3400 Hz band formatted according to the ITU G.711 standard as uncompressed, 8-bit PCM logarithmically-quantized samples.

In some examples, a telecommunication system can include a network gateway. The network gateway can transcode payloads of packets in the communication session to convert between media capabilities, e.g., codecs. The network gateway can additionally report information of capacity or utilization of transcoding units performing the transcoding. In some examples, the telecommunication system can include an anchoring network device that receives the information. The anchoring network device can adjust capability information of communication session(s) being transcoded by the network gateway. This can reduce the utilization of (e.g., the load on) the transcoding units. In some examples, a network gateway system can include both the network gateway and the anchoring network device.

Illustrative Configurations

FIG. 1 is a block diagram illustrating a telecommunication system 100 according to some examples. The system includes terminals 102 and 104, e.g., user equipment or other mobile phones or communications devices or terminals. The terminals 102 and 104 can be operated, e.g., by a user and a second user respectively (not shown). The terminals 102 and 104 are communicatively connected to an anchoring network device 106, e.g., via respective access networks 108 and 110. The anchoring network device 106 can include, e.g., a Telephony Application Server (TAS) or an Access Transfer Control Function (ATCF) of an IMS in a VoLTE-capable network, e.g., of an originating or terminating IMS. A telecommunications network can include, or can intercommunicate with or via, access networks 108 and 110.

The terminals 102 and 104 may be implemented as any suitable computing devices configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, and/or similar mobile devices. Although this description predominantly describes the terminals 102 and 104 as being "mobile" or "wireless," (e.g., configured to be carried and moved around), it is to be appreciated that the terminals 102 and 104 may represent various types of communication devices that are generally stationary as well, such as televisions, desktop computers, game consoles, set top boxes, and the like. In this sense, the terms "communication device," "wireless device," "wireline device," "mobile device," "computing device," "terminal," "user equipment," and "UE" may be used interchangeably herein to describe any communication device capable of performing the techniques described herein. In some examples, some terminals can have specific media handling requirements and thus only accept specific media codecs or components in a session description.

In some examples, terminals 102 and 104 are communicatively connectable with each other, a media server 112, or other devices (omitted for brevity) via network 114. Network 114, in this example, includes access networks 108 and 110 and a core network, discussed below, but this is not limiting. In some examples, media server 112 can be a video or audio streaming server, a multi-party audio- or video-conferencing server, a real-time information server such as a stock-price server, or another computing device that facilitates or participates in communication sessions carried by network 114. Media server 112 can be an example of a terminal. Media server 112 can be or include a mobile device, or can be or include a device not designed for mobility, such as a rack-mounted server.

A communication session between terminals 102 and 104 is managed by signaling traffic, e.g., packets conveying instructions to set up or tear down the communication session. In some examples herein, signaling traffic is described in the context of the Session Initiation Protocol (SIP, RFC 3261). However, this is not limiting, and other signaling protocols and techniques can be used with, or to implement, functions described herein. In some examples, signaling traffic of a communication session, e.g., SIP requests and responses or other signaling traffic, may pass to or through anchoring network device 106 or other proxies, user-agent servers or clients, or back-to-back user agents (B2BUAs). SIP or other signaling traffic can include an initiation request from a calling terminal (e.g., terminal 102), to a called terminal (e.g., terminal 104). The use of "calling" and "called" does not imply that the session must be a voice call.

As used herein, an "anchoring network device" is a network device through which at least some signaling traffic for a communication session, e.g., SIP traffic, passes for the duration of an established phase of the communication session. That session is "anchored" at the anchoring network device. Anchoring signaling traffic for a session can increase network robustness by isolating the two sides of the anchoring network device. For example, terminal 102 is not required to change its SIP (or other signaling) route to terminal 104 when terminal 104 is handed over from access network 110 to another access network, since that SIP route between terminals 102 and 104 passes through anchoring network device 106. In some examples, anchoring takes place in response to receipt by anchoring network device 106 of a SIP INVITE request, and the anchoring network device 106 transmits a SIP 183 Session in Progress response once anchoring is complete, e.g., once anchoring network device 106 has recorded an indication that the communication session is anchored at that anchoring network device 106. As used herein, a SIP response code ending in "xx", e.g., a SIP 1xx Provisional response, signifies any response of, e.g., class 1 of SIP responses (RFC 3261, § 7.2).

When the first user desires to, e.g., place a call to the second user, or otherwise initiate a session with terminal 104 or media server 112, the terminal 102, e.g., in response to actuation by the first user of a "Send" control 116, transmits an initiation request 118 of a communication session, e.g., a SIP INVITE request, via first access network 108 to called terminal 104. In the illustrated example, initiation request 118 is transmitted via a signaling path 120. Calling terminal 102 can additionally or alternatively communicate via a media path 122, discussed in more detail below. Signaling path 120 and media path 122 can represent different packet flows along a common network, along different networks, or any combination thereof. As shown, media server 112 can communicate via signaling path 120 or media path 122, in some examples.

The initiation request 118, e.g., an outgoing voice call, includes information of a destination 124, e.g., a called terminal 104 with which calling terminal 102 is requesting a session be established. In this example, only one destination is shown, namely the terminal 104. However, the initiation request 118 can specify any number of destinations. The initiation request 118 also includes information 126 indicating one or more media capabilities of the terminal 102. The information 126 of the one or more media capabilities is also referred to as an "offer." In an example, the initiation request 118 includes a SIP INVITE message having a Session Description Protocol (SDP) body including a session description, e.g., the information 126 of the one or more media capabilities. For example, the information 126 can include at least one SDP attribute ("a=") line, e.g., "a=rtpmap:110 amr-wb/16000" for AMR-WB at a 16 kHz sampling rate.

In some examples, the information 126 can indicate multiple codecs or other capabilities. In some examples, the information 126 can indicate priority relationships between the listed capabilities. For example, an SDP body can include a media description ("m=") line listing multiple formats, e.g., multiple codecs. The formats can be listed in descending order of priority, so that, e.g., the most preferred format is listed first on the "m=" line.

Specific media capabilities can include specific codecs, specific signal-integrity techniques, e.g., error-correction codes, buffering and data-loss-mitigation techniques, flow-control techniques, or error-detection techniques. Different media capabilities can be, e.g., respective, different codecs that share a common payload format (e.g., AMR-WB and EVS interoperable, IO, mode), that have respective, different signal-integrity techniques (e.g., EVS channel-aware, ChAw, mode and EVS standard mode), or that differ in other ways.

The anchoring network device 106 receives from the terminal 102 the initiation request 118 and performs load processing 128, e.g., as described below with reference to FIG. 2. In some examples, the load processing 128 modifies the information 126 of the one or more media capabilities to provide modified information 130 of the one or more media capabilities. The anchoring network device 106 then transmits a second initiation request 132 including the modified information 130 to the destination, e.g., to the terminal 104, or to an anchoring network device corresponding to the destination, e.g., a serving call session control function (S-CSCF) communicatively connected with the terminal 104.

The terminal 104 thus receives an initiation request 132 including modified information 130 of the one or more media capabilities. The terminal 104 can respond, e.g., by alerting the second user and transmitting a SIP 180 Ringing response to the terminal 102 (e.g., following exchange of SIP 183, PRACK, UPDATE, and associated 200 OK messages, in some examples). The user of the terminal 104 can then indicate the call should be accepted, e.g., by operating a call-acceptance control 134 such as a touchscreen button. The terminal 104 can then accept the initiation request, e.g., by sending a SIP 200 OK response to the terminal 102. When the called terminal 104 accepts the communication session, e.g., by transmitting the SIP 200 OK, the communication session enters an "established" phase, e.g., a SIP "confirmed dialog state" (RFC 3261, § 12). During the established phase, data can be exchanged between participating terminals. In some examples, the data includes digitized audio of a voice call, DTMF (dual-tone multi-frequency) tone information, or digitized video.

Call initiation can be performed, e.g., as defined in the Global System for Mobile (GSM) or VoLTE standards, and can include the exchange of additional messages (not shown) between the terminals 102 and 104 and the anchoring network device 106. Data of the session, such as audio data or video data formatted as specified in the modified information 130, can be exchanged between terminals 102 and 104 via a communications channel depicted as media path 122, which can pass through anchoring network device 106 or (as shown) can bypass anchoring network device 106.

In some examples, media path 122 can pass through a network gateway 136. For example, the network gateway 136 can include an Access Transfer Gateway (ATGW), e.g., of an originating or terminating IMS. As used herein, the term "network gateway" can indicate, but does not require that, network gateway 136 connects two different networks. Network gateway 136 can be configured to pass traffic between different networks or between different terminals in a particular network, in some nonlimiting examples.

In some examples, signaling path 120 represents a control plane, e.g., carrying SIP signaling. In some examples, media path 122 represents a user plane, e.g., carrying RTP media. In some examples, anchoring network device 106, managing the control plane, communicates with network gateway 136, managing the user plane, via a gateway control protocol or third-party call control protocol. Examples include H.248 ("MEGACO"), VoiceXML, or the Media Server Markup Language (MSML). MSML is often used to control media resource functions (MRFs).

The network gateway can perform transcoding 138 to modify ("rewrite") headers or payloads of packets passing through the network gateway 136. Transcoding 138 can be performed, e.g., to transcode payload data between codecs, as described in more detail below. In some examples, network gateway 136 can provide to anchoring network device 106 information 140 of capacity or load on transcoding units 236, discussed below. For example, network gateway 136 can provide information 140 at least periodically, at random (or pseudorandom, and likewise throughout) time intervals, upon call-status events such as call setup or teardown, or upon request from anchoring network device 106.

In some examples, anchoring network device 106 can, upon receiving a SIP INVITE, a SIP BYE request, a SIP UPDATE request, or another call-status message, send an H.248 or other gateway-control message to network gateway 136. The gateway-control message can include a request for information 140. Network gateway 136 can include information 140 in the response to the gateway-control message, e.g., as additional information in an H.248 response. Piggybacking transmission of information 140 on gateway-control messages in this way can reduce the network load of transmitting information 140, and can increase the complexity of network gateway 136 less than would adding a new protocol (although a dedicated protocol for the exchange of information 140 can be used, in some examples).

In some examples, the gateway-control message may pertain to a specific session. The returned information 140 can pertain to that session. Additionally or alternatively, the returned information 140 can represent the load on transcoding resources of network gateway 136 across multiple sessions or as a whole. Accordingly, in some examples, whenever a session begins, the anchoring network device 106 can perform load processing 128 with respect to that session or with respect to a different session (or both).

In some examples, the anchoring network device 106 can interact with the network gateway 136 during load processing 128. This can permit, e.g., filtering or modifying information 126 or modified information 130 based on what codecs or other media capabilities the network gateway 136 supports. In some examples in which network gateway 136 performs transcoding (e.g., as discussed herein with reference to transcoding units 236), the anchoring network device 106 can interact with the network gateway 136 to determine what codec pairs the network gateway 136 can support for transcoding, given the load of the transcoding units 236.

In some examples, the functions of anchoring network device 106 and network gateway 136 can be combined or otherwise integrated into a network gateway system 142. For example, network gateway system 142 can be or include a VoIP-PSTN gateway configured to proxy SIP signaling and Real-time Transport Protocol (RTP) media, e.g., in the G.722 codec, to SS7 signaling and G.711 media over a circuit-switched trunk. Additionally or alternatively, network gateway system 142 can be or include a WebRTC gateway configured to proxy SIP-over-Websockets signaling and Secure RTP (SRTP) media in the Opus codec, e.g., from a user's Web browser, to SIP-over-TCP or -UDP signaling and RTP media in the EVS codec, e.g., in an IMS of an LTE network. These example gateway operations can additionally or alternatively be carried out by separate, intercommunicating anchoring network devices 106 and network gateways 136. In some examples, a network gateway system 142 can be or include a WebRTC gateway, Interconnect Session Border Controller (ISBC), other ISBC, Media Gateway (MGW), Breakout Gateway Control Function (BGCF), or ATGW. Although various examples herein are described in terms of audio streams for brevity of explanation, other types of data streams can also be processed by a network gateway system 142, e.g., video or text streams. For example, in a WebRTC context, a Web browser may be using VP8 video, and another party in a session may only support H.265 video. In this example, a network gateway system 142 such as a WebRTC gateway can transcode video between the two codecs.

Figure 2:
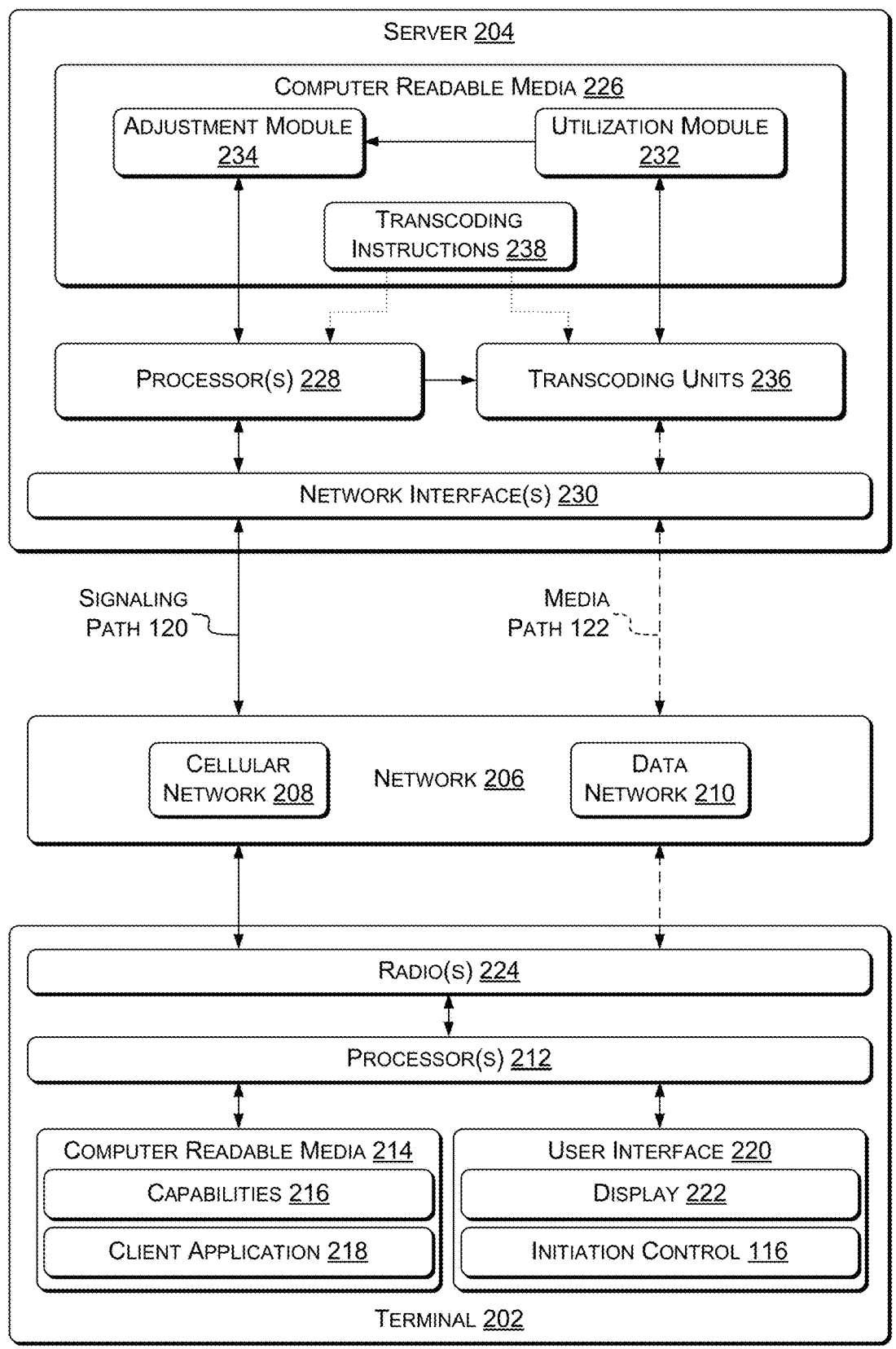
FIG. 2 is a block diagram illustrating a system for implementing capability-information modification according to some implementations.

FIG. 2 is a block diagram illustrating a telecommunication system 200 permitting capability-information modification and codec interworking according to some implementations. For brevity, modification of capability information associated with a session is referred to as "modification" of that session.

The system 200 includes a terminal 202, e.g., a wireless phone or other user equipment such as terminal 102 or 104, FIG. 1, coupled to a server 204 via a network 206. The server 204 can be an example of the anchoring network device 106, FIG. 1, e.g., an ATCF; the network gateway 136, FIG. 1, e.g., an ATGW; or the network gateway system 142, FIG. 1, e.g., a WebRTC gateway. The network 206 can include one or more networks, such as a cellular network 208 and a data network 210. The network 206 can include one or more core network(s) connected to user equipment via one or more access network(s), e.g., access networks 108 or 110. At least one of terminal 202 or server 204 can communicate via network 206 with another terminal or other device, e.g., terminal 104 or media server 112 (omitted for brevity). As in FIG. 1, dashed lines represent media path 122.

The cellular network 208 can provide wide-area wireless coverage. Example cellular networks 208 can include second-generation (2G) cellular networks such as the GSM or Code Division Multiple Access (CDMA), or third-generation (3G) cellular networks such as the Universal Mobile Telecommunications System (UMTS). Other example cellular networks 208 can include Enhanced Data GSM Environment (EDGE), GSM EDGE Radio Access Network (GERAN), UMTS Terrestrial Radio Access Network (UTRAN), or fourth-generation (4G) cellular networks, such as LTE carrying VoLTE sessions using SIP signaling. Other example cellular networks 208 can include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), General Packet Radio Service (GPRS), Advanced Mobile Phone System (AMPS), High Speed Packet Access (HSPA), evolved HSPA (HSPA+), The data network 210 can include various types of networks for transmitting and receiving data (e.g., packets), including networks using technologies such as IEEE 802.1x protocols, wireless microwave access (WIMAX), WIFI, IEEE 802.15.1 ("BLUETOOTH"), Asynchronous Transfer Mode (ATM), and other network technologies, e.g., configured to transport IP packets, and/or any future IP-based network technology or evolution of an existing IP-based network technology. In some examples, the server 204 includes or is communicatively connected with an interworking function (IWF) or other device bridging networks, e.g., LTE, 3G, or POTS networks. In some examples, the server 204 can bridge SS7 traffic from the PSTN, or WebRTC traffic from the public Internet, into the network 206, e.g., permitting PSTN customers to place calls to cellular customers and vice versa.

In some examples, the cellular network 208 and the data network 210 can carry voice or data. For example, the data network 210 can carry voice traffic using Voice over Internet Protocol (VoIP) or other technologies as well as data traffic, or the cellular network 208 can carry packets using High Speed Packet Access (HSPA), LTE, or other technologies as well as voice traffic. Some cellular networks 208 carry both data and voice in a packet-switched format. For example, many LTE networks carry voice traffic in packets according to the voice-over-LTE (VoLTE) standard. Many data networks 210 can carry over-the-top (OTT) sessions encapsulating, e.g., voice or video data in a way transparent to an underlying packet transport. Various examples herein provide origination and termination of, e.g., carrier-grade voice calls on, e.g., circuit-switched (CS) networks 206 or mixed VoLTE/3G networks 206, and on terminals 202 including original equipment manufacturer (OEM) handsets and non-OEM handsets. Communications between the server 204 and terminals such as the terminal 202 can additionally or alternatively be performed using other types of networks 206, such as Ethernet, optical links (e.g., Synchronous Optical NETwork, SONET), or other computer networks, or Plain Old Telephone Service (POTS) or PSTN lines, e.g., using Signaling System 7 (SS7) signaling.

The terminal 202 can be or include a wireless phone or any other type of terminal, such as discussed herein with reference to FIG. 1. The terminal 202 can include one or more processors 212, e.g., one or more processor devices such as microprocessors, microcontrollers, central processing units (CPUs), graphics processing units (GPUs), general-purpose GPUs (GPGPUs), field-programmable gate arrays (FPGAs), application-specific integrated circuits (ASICs), Application-Specific Standard Products (ASSP), System-On-a-Chip systems (SoCs), programmable logic devices (PLDs), programmable logic arrays (PLAs), programmable array logic devices (PALs), or digital signal processors (DSPs).

Terminal 202 can include one or more computer readable media (CRM) 214, such as memory (e.g., random access memory (RAM), solid state drives (SSDs), or the like), disk drives (e.g., platter-based hard drives), another type of computer-readable media, or any combination thereof. The computer readable media 214 can be used to store data and to store instructions that are executable by the processors 212 to perform various functions as described herein. The computer readable media 214 can store various types of instructions and data, such as an operating system, device drivers, etc. The processor-executable instructions can be executed by the processors 212 to perform the various functions described herein.

The computer readable media 214 can be or include computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information and which can be accessed by the processors 212. Tangible computer-readable media can include volatile and nonvolatile, removable and non-removable media implemented in any method or technology for storage of information, such as computer readable instructions, data structures, program modules, or other data.

The computer readable media 214 can store information 216 of one or more capabilities of the terminal 202. The information 216 can include, e.g., indications of voice or video codecs supported by the terminal 202.

The computer readable media 214 can include processor-executable instructions of a client application 218. The client application 218, e.g., a native or other dialer, can permit a user to originate and terminate communication sessions associated with the terminal 202, e.g., wireless phone. In some examples, the terminal 202 can, under control of the client application 218, transmit to the server 204 the initiation request 118 indicating the destination 124 and the information 126 of the capabilities, e.g., as discussed above with reference to FIG. 1.

The terminal 202 can further include a user interface (UI) 220, e.g., including a display 222, e.g., an electronic display device, a speaker, a vibration unit, a touchscreen, or other devices for presenting information to a user and receiving commands from the user. The user interface 220 can include a session-initiating user interface control 116, e.g., a touchscreen or physical button, to indicate a communication session should be initiated. The user interface 220 or components thereof, e.g., the display 222, can be separate from the terminal 202 or integrated with the terminal 202. The terminal 202 can further include one or more radio(s) 224 configured to selectively communicate wirelessly via the network 206, e.g., via an access network 108 or 110, or one or more transceivers (not shown) configured to selectively communicate using wired connections via the network 206. Radio(s) 224 can include, e.g., radios for any of the wireless or cellular protocols listed herein, or future packet- or cell-based evolutions thereof. Radios 224 can be examples of network interfaces. In some examples, a communications interface of terminal 202 can include at least one of a network interface (e.g., radio(s) 224), a memory interface (e.g., for communication between processor(s) 212 and CRM 214), or a bus interface (e.g., a local bus interface or pluggable-bus interface, such as Peripheral Component Interconnect, PCI, PCI Express, PCIe, or Serial Advanced Technology Attachment, SATA).

The server 204 can include one or more computer readable media (CRM) 226 communicatively connected with one or more processor(s) 228. The processor(s) 228 can be connected with one or more network interface(s) 230 permitting processor(s) 228 to communicate via network 206. CRM 226 can be of any of the types described herein with reference to computer readable media 214. Processor(s) 228 can be of any of the types described herein with reference to processor(s) 212. In some examples, a communications interface of server 204 can include at least one of a network interface 230, a memory interface to CRM 226, or a bus interface.

The CRM 226 can be used to store processor-executable instructions to perform load processing 128. For example, CRM 226 can store executable instructions of a utilization module 232 or an adjustment module 234. The processor-executable instructions can be executed by the processors 228 to perform various functions described herein. In some examples, server 204 includes either utilization module 232 or adjustment module 234. In other examples, server 204 includes both utilization module 232 and adjustment module 234. In some examples, processor(s) 228 and, if required, CRM 226, are referred to for brevity herein as a "control unit." For example, a control unit can include a CPU or DSP and instructions executable by that CPU or DSP to cause that CPU or DSP to perform functions described herein. Additionally or alternatively, a control unit can include an ASIC, FPGA, or other logic device(s) wired (physically or via blown fuses or logic-cell configuration data) to perform functions described herein.

The server 204 can include a plurality of transcoding units 236 configured to transcode data of communication session(s). The transcoding units 236 can be implemented using at least one of any of the following: an FPGA, an ASIC, an ASSP, an SoC, a Complex Programmable Logic Device (CPLD), a PLD, a PLA, a PAL, a CPU, a GPU, or a GPGPU.

In some examples, the transcoding units 236 can include DSP (or GPU, and likewise throughout this discussion) cores configured to execute DSP programs to perform the transcoding. In some examples, the transcoding units 236 can include processor 228 or other processor(s), or processes or threads executing on any of those. In some examples, CRM 226 can store DSP- or processor-executable instructions, shown as transcoding instructions 238, to perform the transcoding.

In some examples, the transcoding units 236 can include respective transcoding logic units. For example, a transcoding logic unit can include a portion of an ASIC, FPGA, or other logic device (e.g., as listed above) configured to perform transcoding in a manner other than, or at least partly in addition to, execution of instructions stored in a CRM such as CRM 226. For example, while CPUs, GPUs, GPGPUs, and DSPs all execute instructions stored in a memory, the functions of CPLDs are hardwired into their structure. FPGA and ASIC implementations of transcoding units 236 can include hardwired or programmably-connected hardware structures. Such implementations may additionally include processors executing instructions, but this is not required.

Still referring to FIG. 2 and also referring to FIG. 1, in some examples, utilization module 232 can determine a utilization of the plurality of transcoding units 236. For example, utilization module 232 can determine how many, or what percentage, of the transcoding units 236 are in use for sessions being handled by the transcoding units 236. In some examples, utilization module 232 can receive or retrieve information 140 from the transcoding units 236, e.g., telemetry information such as a CPU load average in a software-based transcoding implementation, or an assignment of transcoding logic units or DSP cores to sessions in an FPGA- or DSP-based transcoding implementation. In some examples, utilization module 232 can determine the utilization based at least in part on stored tables indicating, e.g., assignments of transcoding units 236 to communication sessions. For example, utilization module 232 can assign transcoding units 236 to communication sessions, e.g., in response to gateway-control messages. Examples are discussed herein, e.g., with reference to FIG. 14. Utilization module 232 can keep records of the assignments, and respond to requests for utilization based on those records.

In some examples, the utilization is associated with a predetermined time period. For example, the predetermined time period can include the time at which the telemetry information is collected. Additionally or alternatively, the predetermined time period can be a time period after the time at which the telemetry information is collected.

In some examples, utilization module 232 can maintain a history of load information and can determine the utilization using the history. For example, utilization module 232 can determine the utilization for a future time period by extrapolating historical data, e.g., using linear, logarithmic, or exponential regression, moving averages, weighted averages, or any combination thereof. This can permit predictively or proactively reducing load, e.g., when trends indicate that load is rising. For example, call volume often rises significantly and unpredictably when an event of regional or national significance takes place, e.g., an earthquake or a World Series victory. Determining utilization for a future time can permit proactively reducing load as call volume increases, which in turn permits the network gateway system 142 to handle more total calls (or other sessions).

Table 1 shows an example of relative loads of various codec pairs. In Table 1, the "transcoding resource density" represents the number of transcoding units 236 available for the given codec pair. Accordingly, the highest transcoding resource density corresponds with the lowest relative load. The examples of Table 1 are used herein, but are not limiting. The specific relative loads of various codec pairs can be determined empirically, or based on the architectures of specific transcoding units or resources.

TABLE 1

| Codec pair | Transcoding Resource Density | Relative Load |
|---|---|---|
| PCMU-AMR-WB | 546 | Lowest |
| Opus-AMR-WB | 475 | Low |
| Opus-PCMU | 386 | High |
| Opus-AMR-NB | 294 | Highest |

In some examples, at least one of utilization module 232 or adjustment module 234 can determine that the utilization satisfies a predetermined load criterion. For example, the load criterion can specify a number or percentage of the transcoding units 236 that corresponds to a high-load condition (e.g., over 50%, or over 80%). The adjustment module 234 can adjust information of a communication session anchored at server 204 to reduce load on the transcoding units 236.

For example, the adjustment module 234 can modify the information 126 of the one or more media capabilities based at least in part on the utilization to determine the modified information 130. The server 204 can then transmit the initiation request 132 including the modified information 130 to terminal 104, e.g., via a second anchoring network device (omitted for brevity), e.g., on the terminating side of the session. For example, the second anchoring network device can be an S-CSCF of terminating user equipment or a BGCF for bridging calls to non-VoLTE networks. The second anchoring network device can receive the initiation request 132 from the server 204 and pass it to the terminal 104 (e.g., user equipment).

In some examples, the adjustment module 234 can modify the information 126 based at least in part on a predetermined list of acceptable media capabilities. For example, an operator of network 206 can define a set of requirements. Media capabilities not meeting those requirements can be removed from the information 126 to form the information 130.

In some examples, server 204 can receive packets from terminal 202 (or, e.g., terminal 102, terminal 104, or media server 112). Transcoding units 236 can modify or at least one payload of a received packet to provide a modified packet. Additionally, in some examples, processor 228 or transcoding units 236 can modify at least one header of the received packet to provide the modified packet. Server 204 can then transmit the modified packet toward its destination (e.g., terminal 104 or terminal 202). This can permit interworking between terminals that support different codecs.

In some examples, the server 204 can be configured to modify packets only in one direction of a communication session (e.g., terminal 102 to terminal 104 or vice versa), or to modify packets in both directions of a communication session. In some examples, server 204 can include hardware or processing resources for processing one packet at a time, or more than one packet at a time. In some examples, the information 126 and the modified information 130 can indicate respective Multipurpose Internet Mail Extensions (MIME) types with the same type but different subtypes, e.g., audio/EVS and audio/AMR-WB. In some examples, the server 204 can be configured to modify packets or headers associated with commonality between two media capabilities, e.g., to only modify audio headers or payloads associated with an audio/video stream from one terminal if the other terminal is an audio-only terminal.

Figure 3:
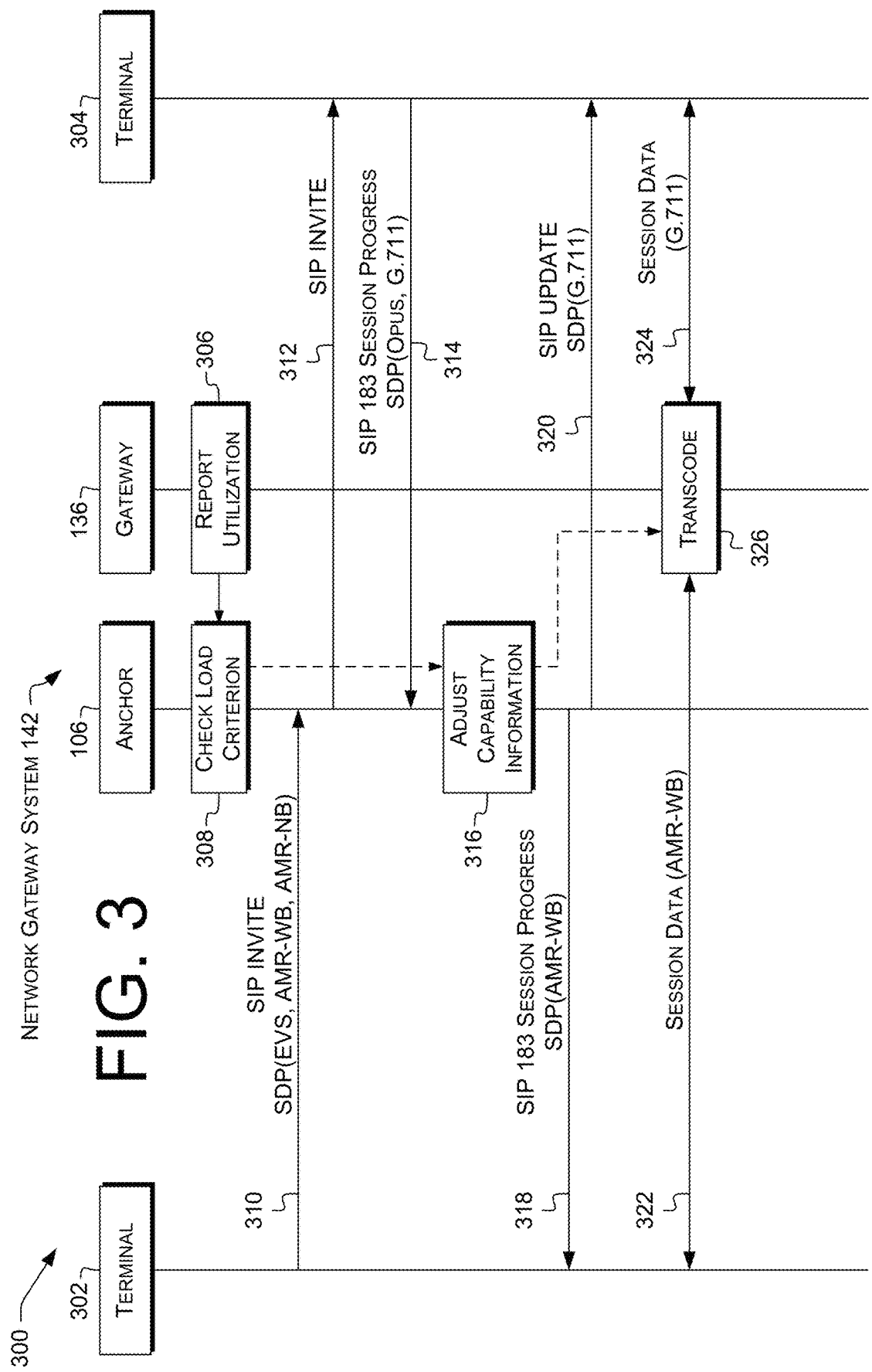
FIG. 3 shows an example call flow illustrating modification of media-capability information during establishment of a communication session.

FIG. 3 shows an example call flow 300 from a terminal 302, which can represent calling terminal 102, to a terminal 304, which can represent called terminal 104 or media server 112. Example functions described herein with reference to FIG. 3, 4, or 5 can be performed, e.g., by modules 232 or 234 of server 204, another network gateway system 142, or another anchoring network device 106 in coordination with another network gateway 136. For clarity of explanation, functions described as being performed by anchoring network device 106 or network gateway 136 can additionally or alternatively be performed by corresponding component(s) of network gateway system 142.

At block 306, network gateway 136 can determine the utilization of its plurality of transcoding units 236, and report the utilization to anchoring network device 106. Examples are discussed herein, e.g., with reference to utilization module 232. In some examples, network gateway 136 can report the utilization via a control protocol such as H.248 or other protocols noted above. In some examples, anchoring network device 106 and network gateway 136 communicate, e.g., using H.248 messages, each time a new session is established or torn down. For example, when a call is disconnected, network gateway 136 can report the transcoder utilization after the disconnection in an H.248 message.

In some examples, anchoring network device 106 can use H.248 or similar messages to request transcoder resources. Network gateway 136 can respond to these requests with utilization data. Anchoring network device 106 can then direct changes in codecs, as discussed herein, based at least in part on the utilization data. In some examples, anchoring network device 106 can receive a session-initiation request such as initiation request 310 (discussed below). Anchoring network device 106 can then transmit a gateway-control message to network gateway 136. The gateway-control message can include a request for information 140. In response, the network gateway can provide the information 140. Accordingly, blocks 306 and 308 can be executed after the INVITE (e.g., initiation request 310) instead of or in addition to before the initiation request 310, as is shown. In some examples, blocks 306 and 308, and similar blocks throughout, can be performed in response to any interaction between anchoring network device 106 and network gateway 136 that includes information 140.

At block 308, network gateway 136 or (as shown) anchoring network device 106 can determine that the utilization satisfies the predetermined load criterion. Examples are discussed herein, e.g., with reference to utilization module 232 or adjustment module 234. For example, anchoring network device 106 can determine that the load is too high and should be reduced, or that a rate of growth in the load should be reduced.

In the illustrated example, terminal 302 sends an initiation request 310, e.g., in the form of a SIP INVITE with an SDP message body. Initiation request 310 can represent initiation request 118. Initiation request 310 can be an example of an offer message. Initiation request 310 or contents thereof, e.g., the SDP body or a codec list therein, can represent or be referred to as an offer message, and can specify a first plurality of codecs. In this example, the SDP body offers the EVS, AMR-WB, and AMR-NB codecs. In the illustrated example, the initiation request 310 reaches network gateway system 142, or anchoring network device 106 that is communicatively connected with a network gateway 136. In some examples, the initiation request 310 can be proxied, received, or otherwise handled by additional or alternative device(s), e.g., other gateways omitted for brevity.

For brevity, various examples herein refer to modifications to a codec list, e.g., carried in an SDP body. These examples, unless otherwise indicated, can additionally or alternatively be used with information 126 or modified information 130 of capabilities other than codecs, e.g., bandwidth limits or other system limitations.

In the illustrated example, anchoring network device 106 provides a second offer message 312 to terminal 304. The illustrated second offer message 312 does not include a codec list, although it may in other examples. Sending the second offer message 312 without a codec list is an example of "late transcoding" or other techniques in which the anchoring network device 106 decides which codecs to use for a session only after receiving capability information from at least two (e.g., all) terminals associated with the session.

In the illustrated example, terminal 304 responds to the second offer message 312 with an answer message 314 specifying a second plurality of codecs. For example, the answer message 314 can include a SIP response, e.g., a SIP 183 Session Progress response, a SIP 180 Ringing response, or a SIP 200 OK response. In this example, the answer message 314 includes a SIP 183 response specifying the Opus and G.711 codecs.

At block 316, which can represent at least part of load processing 128, the anchoring network device 106 can adjust capability information of the session with which terminals 302 and 304 are associated to reduce load on the network gateway system 142, e.g., on the network gateway 136. For example, anchoring network device 106 can modify the information 126 of the one or more media capabilities (e.g., in the SDP body) to provide the modified information 130, e.g., based at least in part on the first plurality of codecs and the second plurality of codecs. Block 316 can include adding rules to the front or back of the codec list, or in the middle of the codec list, e.g., immediately before or after a specified codec; removing codecs; or reordering codecs. Block 316 can provide the modified information 130 associated with a codec pair that has reduced load compared to another candidate codec pair. Also, at block 316, as indicated by the output dashed line, the anchoring network device 106 can provide to the network gateway 136 an indication of which codecs are to be used for the session. In other examples, e.g., discussed below, load processing 128 can additionally or alternatively be performed before forwarding the INVITE (second offer message 312) or at other times in the session.

In the illustrated example, transcoding is required, since the first plurality of codecs and the second plurality of codecs have no overlap. The anchoring network device 106 can, in response to the determination at block 308 (as indicated by the input dashed line), select a lower-load codec pair. For example, under lightly-loaded conditions, the anchoring network device 106 can select EVS for terminal 302 and Opus for terminal 304, since each of those codecs provides higher audio quality than alternatives such as AMR-NB or G.711. Under moderately-loaded conditions, the anchoring network device 106 can select AMR-NB for terminal 302 and Opus for terminal 304, e.g., in a system in which transcoding between those codecs can be performed with reduced transcoder load compared to EVS-Opus transcoding. Under heavily-loaded conditions, the anchoring network device 106 can select AMR-WB for terminal 302 and G.711 for terminal 304, e.g., in a system in which AMR-WB-G.711 transcoding requires even fewer transcoder resources than AMR-NB-Opus transcoding. These examples are illustrative and not limiting; specific codec selections at block 316 can be performed based on predetermined information, e.g., stored in CRM 226, about the relative transcoder loads of various codec pairs.

At or subsequent to block 316, anchoring network device 106 can transmit session-change messages to the terminals 302, 304 with which the session is associated. Session-change messages can include SIP responses, SIP re-INVITE requests, SIP UPDATE requests, or other messages conveying modified capability information, e.g., modified information 130 of media capabilities. In the illustrated example, anchoring network device 106 can transmit a SIP 183 response 318, e.g., a second answer message, to terminal 302. The response 318 can indicate, e.g., in an SDP body thereof, that AMR-WB is the selected codec. Also in the illustrated example, anchoring network device 106 can transmit a SIP UPDATE request 320 (or other session-change request) to terminal 304 indicating, e.g., in an SDP body thereof, that G.711 is the selected codec. Additionally or alternatively, the SDP body can include a flag indicating that the codecs have been changed.

In some examples, to reduce load on network gateway 136, anchoring network device 106 can change a type of a media stream. For example, video streams generally have much higher data rates than audio streams and so generally consume more transcoder resources than audio streams. Accordingly, at block 316, anchoring network device 106 can remove a video stream from the session, e.g., by setting the port number in the corresponding SDP "m=" line to zero (RFC 3264, § 8.2). In some examples, anchoring network device 106 can remove all video streams from the session, leaving only audio streams. In various examples, therefore, anchoring network device 106 can change the information 126 indicating the media capabilities in at least one of the following ways: removing some or all codecs of a particular type (e.g., audio, video, or instant messaging); adding at least one codec of a particular type; or removing all codecs of a particular type and adding at least one codec of a different type.

Other SIP or other signaling messages can be exchanged to establish the session; such messages are omitted for brevity and for clarity of explanation. In some examples, other network gateway system 142 are involved in the session, e.g., due to cellular roaming. In some examples, each network gateway system 142 involved in the session can perform its own transcoder-load processing as described herein. In some examples, the network gateway systems 142 do not exchange transcoder-load information, though this is not required.

Once the session is established, terminals 302 and 304 can exchange data via network gateway 136. For example, terminal 302 can communicate session data 322 using the AMR-WB codec. Terminal 304 can communicate session data 324 using the G.711 codec.

At block 326, network gateway 136 can transcode between codecs, e.g., between AMR-WB and G.711 in the illustrated example. This can permit communication between terminals that have no codecs in common. Block 326 can include adding, removing, adjusting, or replacing headers, payloads (or portion(s) thereof), or other portions (e.g., padding bits) of packets of session data 322 or 324. For example, transcoding between EVS interoperable (IO) mode and AMR-WB can be accomplished at block 326 by replacing headers without changing the payload, since EVS IO mode and AMR-WB share a payload format. Block 326 can include, in some examples, modifying packets only to terminal 304, only to terminal 302, or in either direction. In some examples, block 326 can include modifying packets of unicast or multicast communication sessions. Transcoding between codecs selected based at least in part on transcoder load, e.g., as discussed herein with reference to block 316, can permit network gateway 136 to handle more communication session than would codec selection based solely on the codecs offered by the terminals in a session.

Figure 4:
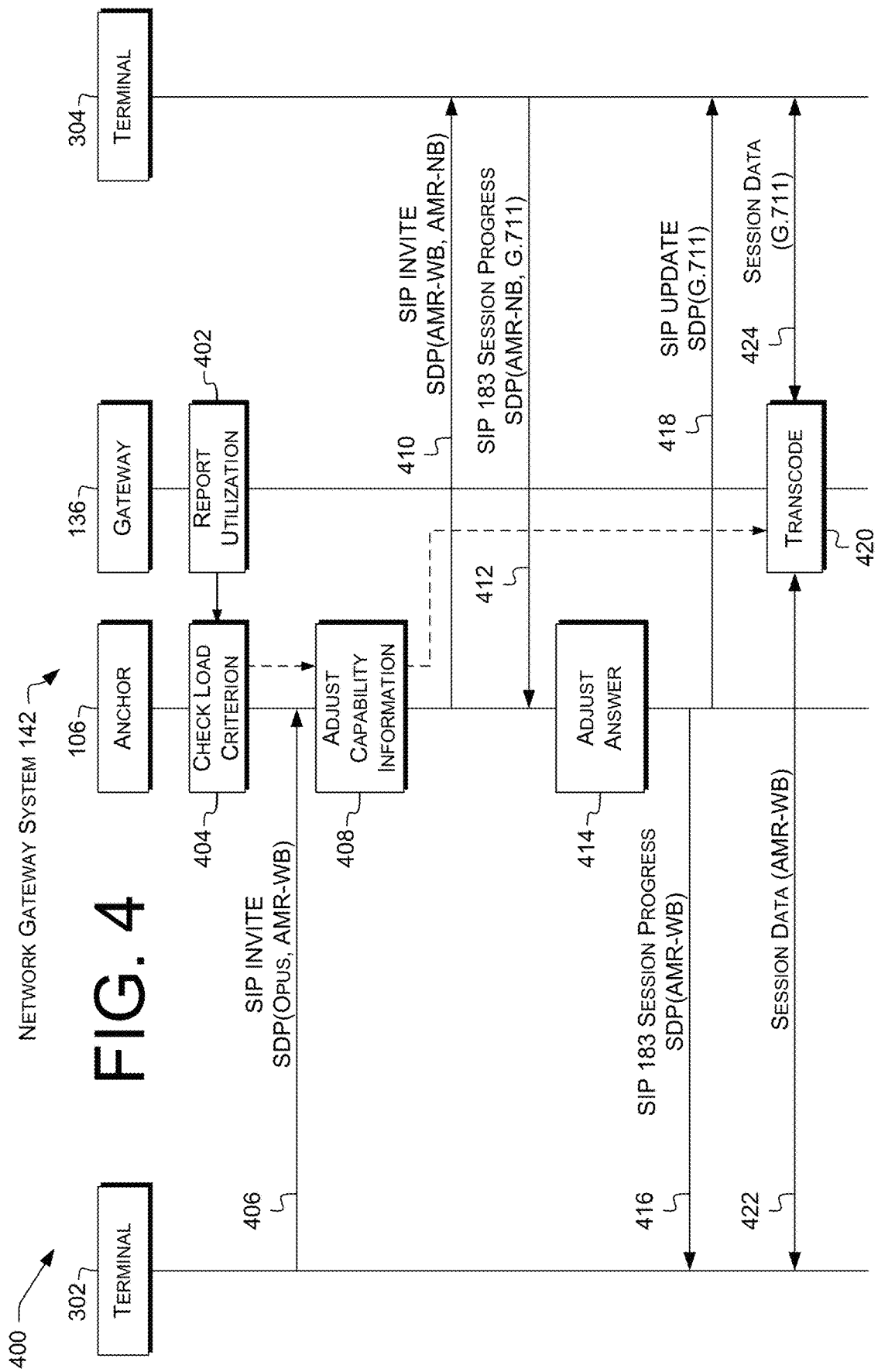
FIG. 4 shows an example call flow illustrating modification of media-capability information during establishment of a communication session.

FIG. 4 shows an example call flow 400 from terminal 302 to terminal 304 (both FIG. 3). As in FIG. 2, terminal 304 can represent terminal 104 or media server 112.

At block 402, network gateway 136 can determine the utilization of its plurality of transcoding units 236, and report the utilization to anchoring network device 106. Examples are discussed herein, e.g., with reference to block 306.

At block 404, network gateway 136 or (as shown) anchoring network device 106 can determine that the utilization satisfies the predetermined load criterion. Examples are discussed herein, e.g., with reference to block 308.

In the illustrated example, terminal 302 sends an initiation request 406, e.g., in the form of a SIP INVITE with an SDP message body. Examples are discussed herein, e.g., with reference to initiation request 310. As in FIG. 3, initiation request 406 can be an example of an offer message.

As discussed above with reference to FIG. 3, the exchange of information 140 can be conducted in a gateway-control message exchange triggered by receipt of initiation request 406. Accordingly, blocks 402 and 404 can be performed after receipt of initiation request 406 instead of before, as is shown in FIG. 4.

At block 408, anchoring network device 106 can adjust capability information in the initiation request 406, e.g., by adjusting an SDP body thereof. In some examples, block 408 can include removing at least one, or all, codecs from the codec list of initiation request 406. In some examples, block 408 can include adding at least one codec to the codec list of initiation request 406. Adding codecs that can be transcoded within the available resources can increase the probability of successfully establishing a session. Moreover, adjusting the information of the capabilities can prevent terminal 304 from selecting only codecs that network gateway 136 cannot support, e.g., due to transcoder load.

In the illustrated example, initiation request 406 specifies the Opus and AMR-WB codecs. Since the utilization satisfies the predetermined load criterion, in this example, the anchoring network device 106 removes Opus from the codec list in the illustrated example. Moreover, since the available transcoder resources on network gateway 136 can support transcoding between AMR-WB and AMR-NB, anchoring network device 106 adds AMR-NB to the codec list to provide terminal 304 with additional options for establishing a session.

Anchoring network device 106 provides a second initiation request 410 to terminal 304. In this example, second initiation request 410 lists AMR-WB and AMR-NB. Terminal 304 responds with a SIP 183 Session Progress response, shown as answer message 412. In this example, terminal 304 can support AMR-NB and G.711. Since initiation request 406 and answer message 412 do not have any codecs in common, transcoding is required.

At block 414, anchoring network device 106 adjusts the answer message 412 to provide a second answer message 416. Second answer message 416 is shown as a SIP 183 response listing AMR-WB. Anchoring network device 106 can send second answer message 416 to terminal 302. Block 414 can perform other functions of block 316. However, in some examples, processing at block 414 does not require, or does not take into account, transcoder load. Examples of a second answer message 416 are described herein with reference to response 318.

Also at or after block 414, anchoring network device 106 can transmit a session-change message 418 to terminal 304. Session-change message 418 is illustrated as a SIP UPDATE message specifying the G.711 codec, but that is not limiting. Other forms of session-change messages are described herein with reference to request 320. In some examples, session-change message 418 is omitted, and normal offer/answer processing is used based on answer message 412.

At block 420, network gateway 136 can transcode data to permit terminals 302 and 304 to exchange data of an established session via network gateway 136. Examples are discussed herein, e.g., with reference to block 326. For example, terminal 302 can communicate session data 422 using the AMR-WB codec. Terminal 304 can communicate session data 424 using the G.711 codec.

Figure 5:
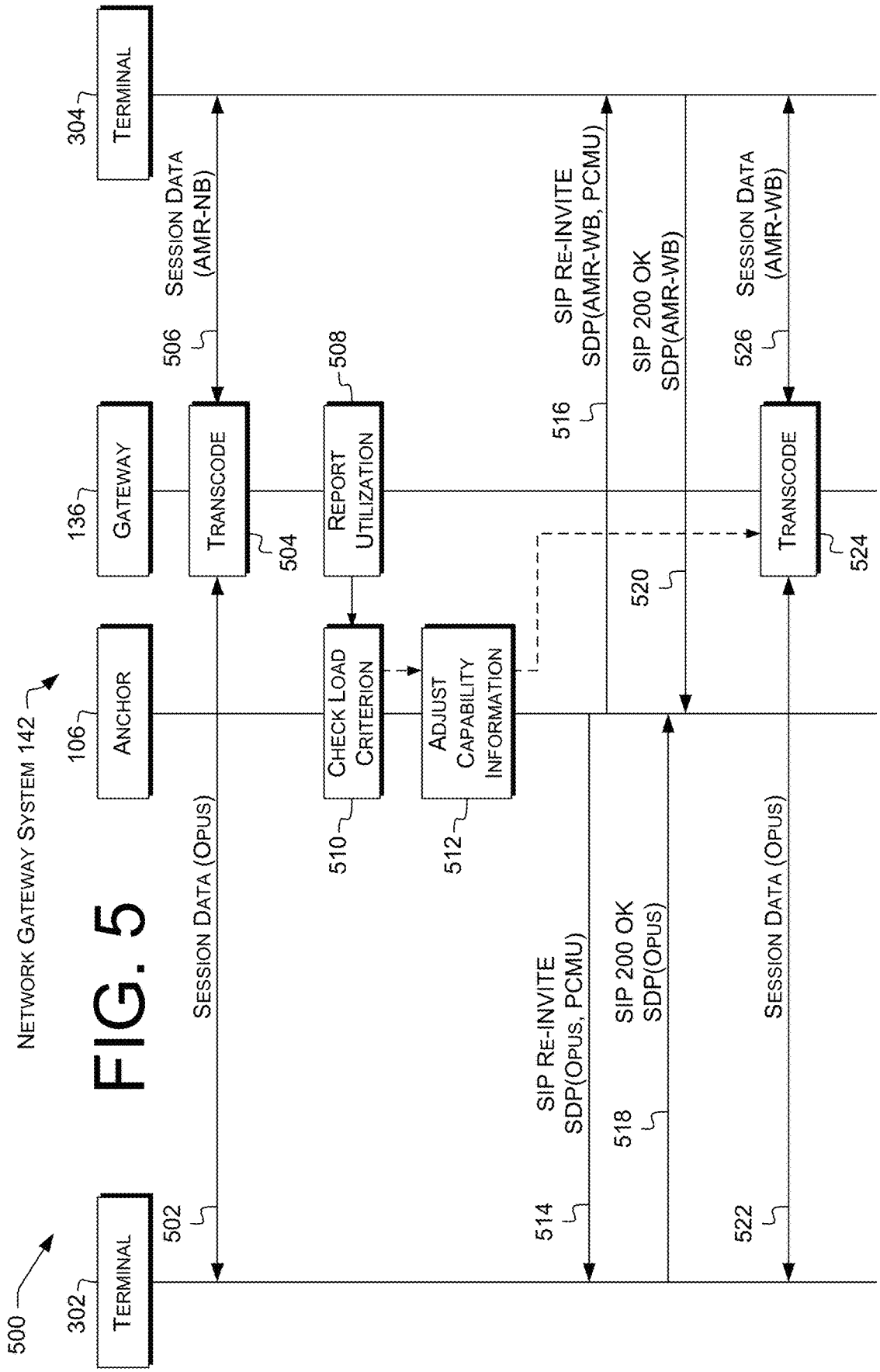
FIG. 5 shows an example call flow illustrating modification of media-capability information during a communication session.

FIG. 5 shows an example call flow 500 from terminal 302 to terminal 304 (both FIG. 3). As in FIG. 2, terminal 304 can represent terminal 104 or media server 112. Call flow 500 begins with an established session, in which terminal 302 is communicating session data 502 that network gateway 136 transcodes, at block 504, to and from session data 506 of terminal 304. Examples are discussed herein, e.g., with reference to block 326. Some examples using operations of call flow 500 can permit adjusting codecs in established sessions to reduce load and thereby reduce the probability of call drops. In the illustrated example, session data 502 uses the Opus codec, and session data 506 uses the AMR-NB codec. As shown in Table 1, this is a relatively high-load codec pair.

At block 508, network gateway 136 can report its status to anchoring network device 106. For example, as described above with reference to information 140, network gateway 136 can provide information 140 indicating its transcoder utilization to anchoring network device 106 in response to a media-control message. Examples are discussed herein, e.g., with reference to block 306.

At block 510, anchoring network device can determine that the utilization satisfies the predetermined load criterion. Examples are discussed herein, e.g., with reference to block 308.

At block 512, e.g., in response to the determination at block 510, the anchoring network device 106 can adjust capability information of the existing communication session (the session that includes session data 502 and 506). For example, anchoring network device 106 can remove the opportunity for an Opus-AMR-NB pair, e.g., by removing AMR-NB from terminal 304's side of the session.

At or after block 512, the anchoring network device 106 can send session-change message(s) to at least one of the terminals involved in the session. In the illustrated example, the session-change message(s) are SIP re-INVITE messages; other session-change messages described herein can additionally or alternatively be used. In some examples, instead of transmitting the session-change message(s) itself, the anchoring network device 106 can transmit a media-control message to the network gateway 136 to cause the network gateway 136 to send the session-change message(s).

In the illustrated example, the session-change message(s) include SIP re-INVITE message 514 to terminal 302 and SIP re-INVITE message 516 to terminal 304. Message 514 lists the Opus and PCMU codecs. Message 516 lists the AMR-WB and PCMU codecs. No matter which of those codecs are selected by the terminals 302 and 304, the resulting codec pair will have lower transcoding load than the transcoding at block 504 (see Table 1), in this example. In some examples, at least one of (or both of) messages 514 and 516 can be UPDATE requests instead of INVITE requests, or can be other session-change messages.

In the illustrated example, terminal 302 responds with a SIP 200 OK response 518 listing Opus in the SDP body. Terminal 304 responds with a SIP 200 OK response 520 listing AMR-WB in the SDP body. Other messages can also be exchanged in the process of re-negotiating the codecs for one or more terminals in a session; such messages are omitted for brevity.

After receiving confirmation from both terminals 302, 304, the anchoring network device 106 can direct the network gateway 136 to change the codec pair used for the session from Opus-AMR-NB to Opus-AMR-WB, thereby reducing the transcoder load on network gateway 136. Terminal 302 can then communicate Opus-format session data 522. Network gateway 136, at block 524, can transcode between the Opus-format session data 522 and AMR-WB-format session data 526 for communication with terminal 304.

Figure 6:
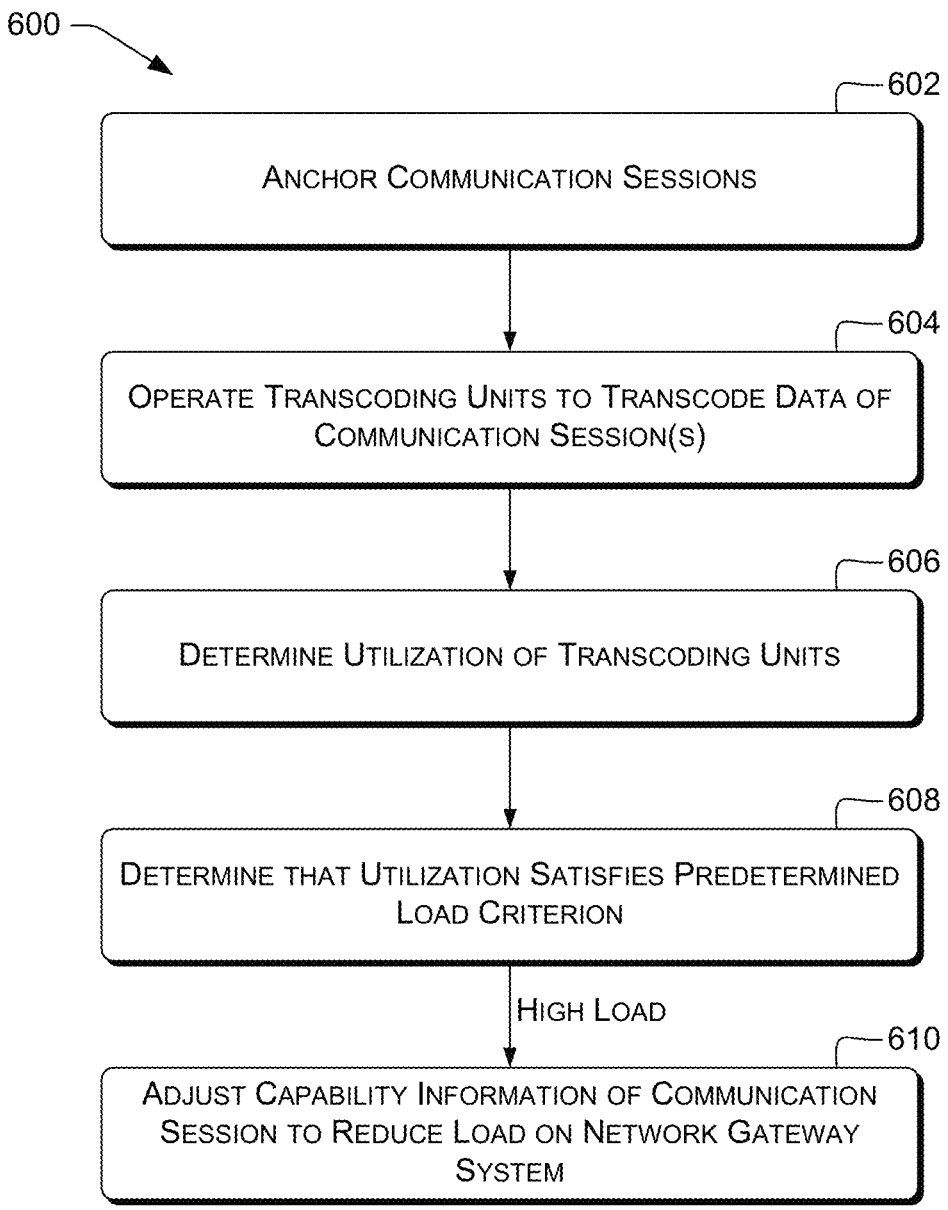
FIG. 6 illustrates an example process for interworking between two terminals, e.g., at establishment of a communication session. Illustrated operations can be performed by a network gateway system, in some examples.

FIG. 6 illustrates an example process 600 for interworking between two terminals, e.g., terminals 302 and 304. The illustrated process 600 can be carried out by a control unit, e.g., of a network gateway system 142 having a network interface (e.g., network interface(s) 230), or of an anchoring network device 106 and a network gateway 136 that are configured to interoperate with each other to carry out the illustrated operations. In some examples, the network gateway system 142 can include one or more processors configured to perform operations described below (or in FIG. 7 or 8), e.g., in response to computer program instructions of the utilization module 232 or the adjustment module 234. In some examples, the network gateway system 142 or the anchoring network device 106 can be configured to anchor at least two communication sessions via the network interface. Each communication session can be associated with at least two terminals, e.g., terminals 302 and 304.

Operations shown in FIG. 6 and in FIGS. 7-14, discussed below, can be performed in any order except when otherwise specified, or when data from an earlier step is used in a later step. For clarity of explanation, reference is herein made to various components, operations, and data transmissions shown in FIGS. 1-5 that can carry out or participate in the steps of the example method. It should be noted, however, that other components can be used; that is, example method(s) shown in FIGS. 6-14 are not limited to being carried out by the identified components, and are not limited to being carried out using the identified operations and data transmissions.

In some examples, at block 602, the control unit can anchor at least two communication sessions via the network interface. For example, the control unit can receive registrations or other signaling traffic associated with each of the at least two communication sessions and can store information about those sessions in memory of or accessible to the control unit. Examples of anchoring are discussed herein with reference to SIP INVITEs and other session-initiation requests.

In some examples, at block 604, the control unit can operate individual transcoding units 236 of the plurality of transcoding units 236 to transcode data of at least one communication session of the at least two communication sessions. Examples are discussed herein, e.g., with reference to block 326.

In some examples, at block 606, the control unit can determine a utilization of the plurality of transcoding units 236. Examples are discussed herein, e.g., with reference to utilization module 232 and block 306. For example, the control unit can receive or retrieve information 140 and extract or determine the utilization from the information 140.

In some examples, at block 608, the control unit can determine that the utilization satisfies a predetermined load criterion. Examples are discussed herein, e.g., with reference to utilization module 232, adjustment module 234, and block 308.

In some examples, at block 610, the control unit can adjust capability information of a first communication session of the at least two communication sessions to reduce load on the network gateway system 142. For example, the transcoder load can be reduced. Block 610 can be performed in response to the determination at block 608 ("High load"). Examples are discussed herein, e.g., with reference to adjustment module 234 and block 316.

In some examples in which the utilization is associated with a predetermined time period, the control unit is configured to adjust the capability information (block 610) prior to commencement of the time period. For example, block 606 can include predicting the utilization at a time in the future, e.g., by extrapolating historical data or by operating a computational model that estimates utilization given a time, date, or other inputs. The control unit can then carry out block 610 prior to, e.g., immediately prior to, or at the commencement of, the time period. This can permit proactively responding to load changes, as discussed herein with reference to the utilization module 232.

In some examples, the control unit can repeat blocks 606, 608, and 610. For example, the control unit can test the utilization against multiple load criteria. In some examples, successively higher loads can trigger successively more restrictive codec selections. The control unit can adjust repeatedly test utilization against the load criteria (block 608), e.g., successively higher load criteria, and adjust capability information accordingly (block 610). Moreover, successively lower loads can trigger successively less restrictive codec selections. Examples are described herein with reference to blocks 812, 814, 1204, 1206, or 1208.

An example network gateway system 142 can be configured to support EVS (most preferred), OPUS, AMR-WB, AMR-NB, and G.711 (least preferred). The example network gateway system 142 can support up to 166 calls (audio sessions) involving transcoding to or from EVS. In some examples, the first load criterion is 50% load on the transcoding units 236. In response to satisfying this criterion, the network gateway system 142 can adjust its priority list to OPUS (most preferred), AMR-WB, AMR-NB, G.711, and EVS (least preferred). New sessions can then be assigned to use Opus instead of EVS, e.g., as discussed herein with reference to FIGS. 7 and 8. In some examples, the second load criterion is 75% load on the transcoding units 236. In response to satisfying this criterion, the network gateway system 142 can adjust its priority list to AMR-WB (most preferred), AMR-NB, G.711, EVS, and OPUS (least preferred). In some examples, the third load criterion is 90% load on the transcoding units 236. In response to satisfying this criterion, the network gateway system 142 can adjust its priority list to G.711 as the only allowed option. This example network gateway system 142 can support up to 245 simultaneous calls instead of 166.

Figure 7:
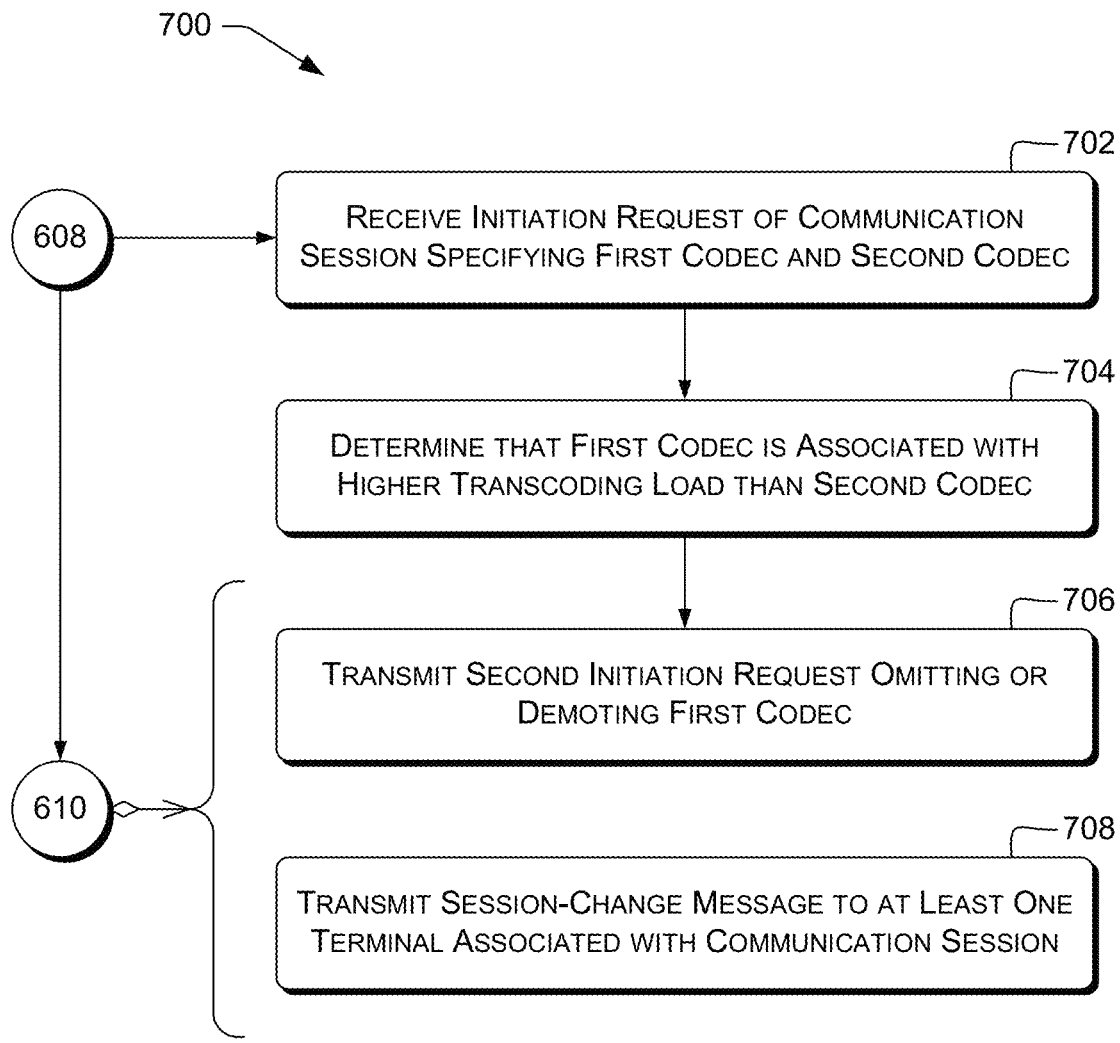
FIG. 7 illustrates an example process for interworking between two terminals, e.g., at establishment of a communication session. Illustrated operations can be performed by a network gateway system, in some examples.

FIG. 7 illustrates an example process 700 for interworking between two terminals, e.g., terminals 302 and 304. The illustrated processes can be carried out by a control unit as discussed herein with reference to FIG. 6. In some examples, block 608 can be followed by blocks 702, 704, and 706. In some examples, block 610 can include blocks 706 or 708. Accordingly, blocks 702-706 can apply to sessions initiated after the determination at block 608 that transcoder load should be reduced due to load associated with existing sessions, in some examples. In some examples, e.g., in which block 610 includes block 706, block 706 can be performed in response to the determination at block 608 that the capability information should be adjusted.

In some examples, the network gateway system 142 is configured to permit interworking between WebRTC terminals and LTE terminals. In some examples, the transcoding units 236 comprise at least one of: a digital signal processor (DSP) core or a transcoding logic unit. In some examples, the illustrated operations can be performed in at least one of the following orders: 604, 606, 608, 610; 604, 606, 608, 702, 704, 706, 610; 606, 608, 610, 604; 606, 608, 702, 704, 706, 610, 604; 702, 704, 706, 606, 608, 610; or any of those orders with block 708 included in or following block 610.

In some examples, at block 702, the control unit can receive an initiation request of the first communication session from a first terminal associated with the first communication session, e.g., terminal 302. The initiation request can specify at least a first codec and a second codec. Examples are discussed herein, e.g., with reference to initiation request 310. Initiation request 310 can indicate a first plurality of codecs, and the first plurality can include the first codec and the second codec. Block 702 can be performed after determining that the utilization satisfies the predetermined load criterion (block 608) in some examples (e.g., FIGS. 3 and 4), although, as discussed above, this is not required.

In some examples, at block 704, the control unit can determine that the first codec is associated with a higher transcoding load than the second codec. For example, the control unit can compare the transcoding loads of the first codec and the second codec, both with respect to other codec(s) currently in use in the session. In the example of FIG. 3, the control unit can compare EVS-Opus transcoding with AMR-WB-Opus transcoding. Additionally or alternatively, the control unit can compare loads of multiple codec pairs, e.g., exhaustively or using a decision tree. For example, the control unit can compare EVS-Opus, EVS-G.711, AMR-WB-Opus, and AMR-WB-G.711.

In some examples, at block 706, the control unit can adjust the capability information by transmitting a second initiation request to a second terminal associated with the first communication session. As noted above, block 706 can be performed in response to the determination at block 608, e.g., as part of block 610. In some examples, blocks 702 and 704 are performed before block 610 and block 706 is performed as part of block 610.

For example, the control unit can transmit a SIP INVITE to a called terminal such as terminal 304. The second initiation request can either omit the first codec, or indicate that the second codec is preferred to the first codec. The latter is referred to for brevity as "demoting" the first codec, e.g., moving it to a less-preferred position in a codec list. For example, in an SDP body of a SIP INVITE, the first codec either can be left out of the codec list or can be placed in the codec list after the second codec. Either change to the codec list reduces the likelihood that the first codec will be selected by the second terminal, and thereby permits reducing the transcoder load.

In some examples, at block 706, the control unit can transmit the second initiation request indicating a third codec. The third codec can be a codec the network gateway system 142 is configured to transcode to at least one of the first codec or the second codec. In an example, G.711 is neither the first codec nor the second codec. However, the network gateway system 142 is configured to transcode between G.711 and at least one of the first codec or the second codec. The control unit can include G.711 in the second initiation request, e.g., as the most preferred codec or in another position in the codec list. This can provide the second terminal with additional codec options and increase the likelihood that the second terminal will select a relatively low-load codec.

Blocks 702-706 can be used, e.g., when the anchoring network device 106 is involved in establishment of the session. Other examples can be used with respect to existing sessions. Some such examples include block 708.

In some examples, at block 708, the control unit can adjust the capability information of the communication session by transmitting a session-change message to at least one of (e.g., each of) the at least two terminals associated with the first communication session. This can permit changing existing communication session(s), e.g., the first communication session, to reduce transcoder load due to those communication session(s). For example, as discussed herein with reference to FIG. 3, the session-change message can include at least one of a SIP re-INVITE message or a SIP UPDATE message. In some examples, SIP UPDATE messages are used during a pre-establishment phase of the session and re-INVITE messages are used during an established phase of the session. In some examples, the second initiation request transmitted at block 706 can be an example of a session-change message.

Figure 8:
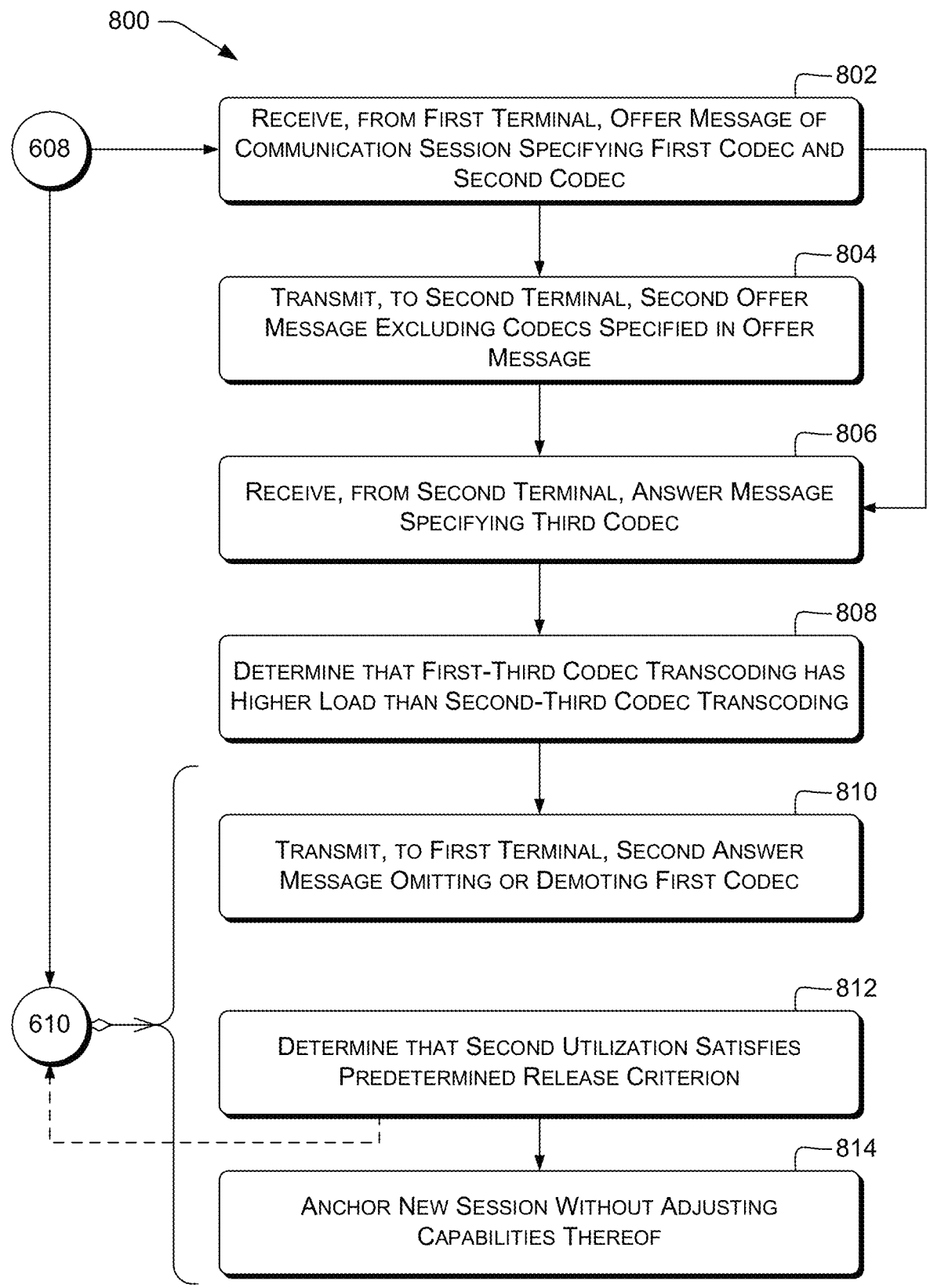
FIG. 8 illustrates an example process for interworking between two terminals. Illustrated operations can be performed by a network gateway system, in some examples.

FIG. 8 illustrates an example process 800 for interworking between two terminals, e.g., terminals 302 and 304. The illustrated processes can be carried out by a control unit as discussed herein with reference to FIG. 6. In some examples, block 608 can be followed by blocks 802-810. Accordingly, blocks 802-810 can apply to, e.g., sessions initiated after the determination at block 608 that transcoder load should be reduced due to load associated with existing sessions, in some examples. Additionally or alternatively, blocks 802-810 can apply to mid-session codec changes of existing sessions, e.g., made in response to transcoder-load changes. In some examples, as shown, block 610 can include at least one of blocks 810, 812, or 814. In some examples, block 610 can be followed by blocks 812 and 814.

In some examples, at block 802, the control unit can receive an offer message of the first communication session from a first terminal, e.g., terminal 302. The first terminal can be associated with the first communication session. The offer message can specify a first codec and a second codec. Block 802 can be followed by block 804 or block 806.

Some examples can use late transcoding, e.g., as discussed herein with reference to FIG. 3. In some examples, at block 804, the control unit can transmit a second offer message to the second terminal. Block 804 can be performed after receiving the offer message (block 802) and before receiving an answer message (block 806), in some examples. The second offer message can be a message that does not indicate any codec specified in the offer message, e.g., a message that does not indicate any codecs at all. Examples are discussed herein, e.g., with reference to second offer message 312.

In some examples, at block 806, the control unit can receive an answer message from a second terminal associated with the first communication session. The answer message can specify a third codec. Examples are discussed herein, e.g., with reference to answer message 314.

In some examples, at block 808, the control unit can determine that the first codec is associated with a higher transcoding load, with respect to the third codec, than is the second codec. In example, the first codec can be G.711, the second codec can be AMR-WB, and the third codec can be Opus. The control unit can determine that Opus-G.711 transcoding is associated with a higher transcoding load than is Opus-WB-AMR transcoding.

In some examples, at block 810, the control unit can adjust the capability information by transmitting a second answer message to the first terminal associated with the first communication session. In some examples, block 810 can be performed in response to the determination that the utilization meets the load condition (block 608). The second answer message can either omit the first codec or indicate that the second codec is preferred to the first codec. Examples are discussed herein, e.g., with reference to response 318. Continuing the example of the previous paragraph, the second answer message can omit G.711, or can indicate that WB-AMR is preferred to G.711. This can permit reducing transcoder load of newly-arriving sessions.

In some examples, in any of blocks 706, 708, 804, or 810, a transmitted message can include a re-ordered codec list, or other information indicating relative priorities of codecs. Additionally or alternatively, a transmitted message can include flag (e.g., Boolean) value(s) indicating that the codec list or priorities have changed, or that specific codecs have been added to, or removed from, the transmitted message compared to the message that triggered the transmission. Flag values or other values can be transmitted, e.g., as new fields in an existing or new SIP header or an existing or new SDP body element.

In some examples, at block 812, the control unit can determine that a second utilization of the plurality of transcoding units satisfies a predetermined release criterion. For example, the control unit can determine the second utilization as discussed herein with reference to block 606, e.g., at a later time than the utilization was determined at block 606. This can permit testing whether the transcoding units 236 are still under high load. The control unit can test the second utilization as described herein with reference to testing the utilization. The release criterion can be of any of the types or mathematical formulations described herein for the load criterion, only testing utilization below a threshold rather than above, in some examples. Block 812 can be followed by block 814.

Additionally or alternatively, as indicated by the dashed arrow, in some examples, block 812 can be followed by block 610. In some examples, at block 610, the control unit can adjust capability information of existing sessions to permit them to use higher-load codecs than they were previously able to. For example, the control unit can send a re-INVITE or UPDATE adding codecs, or higher-load codecs, to the codec list, or promoting higher-load codecs (e.g., indicating their priority has increased) that had formerly been demoted.

In an example in which the load criterion is a utilization of at least 50%, the release criterion can be a utilization of less than 40%. In some examples, each load criterion can have a corresponding release criterion, e.g., of 90% of the load criterion. The load criterion or criteria and the release criterion or criteria can be determined to have hysteresis, as in the example of 50%/40%, or not (e.g., load and release criteria both specifying a utilization of 50%). Using hysteresis can reduce jittering of (e.g., frequent changes in) media capabilities, in some examples. In some examples, e.g., involving predicting utilization for future time periods as discussed herein with reference to FIG. 6, mathematical damping can be used to further reduce jittering of media capabilities.

In some examples, at block 814, the network gateway system 142 can anchor a second communication session, e.g., a new communication session or other session different from the first communication session, without adjusting capability information thereof. Block 814 can be performed in response to the determination at block 812. For example, once transcoder load falls, the network gateway system 142 can return to normal operation, in which codec negotiation takes place without respect to the transcoder load of the codecs. This can provide high-quality media of sessions when transcoding units 236 are lightly loaded.

Figure 9:
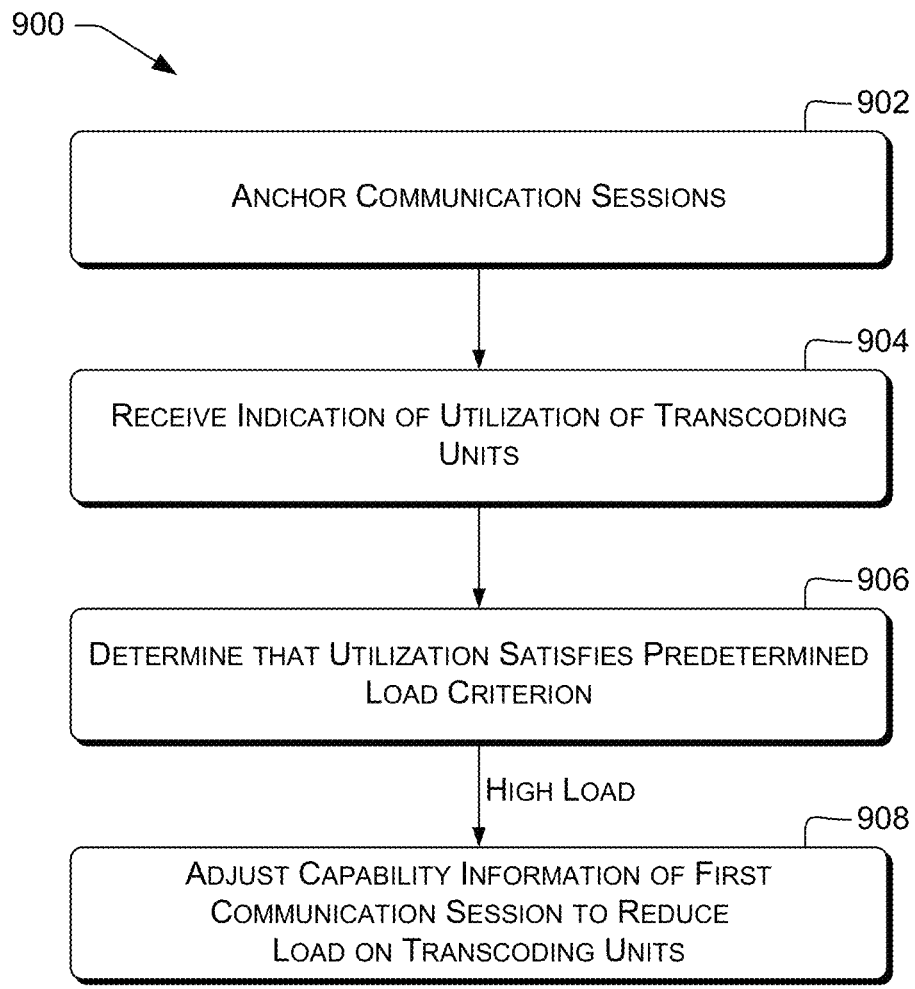
FIG. 9 illustrates an example process for interworking between two terminals. Illustrated operations can be performed by an anchoring network device, in some examples.

FIG. 9 illustrates an example process 900 for interworking between two terminals, e.g., terminals 302 and 304. The illustrated process 900 can be carried out by a control unit, e.g., of an anchoring network device 106 having a communications interface (e.g., network interface(s) 230, or RAM or bus interface(s)), or of other components of a network gateway system 142 that are configured to interoperate with a network gateway 136. In some examples, the anchoring network device 106 (or other components noted in the preceding sentence, and likewise throughout the discussion of FIGS. 9-12) can include one or more processors configured to perform operations described below (or in FIGS. 10-12), e.g., in response to computer program instructions of the adjustment module 234.

In some examples, at block 902, the control unit (e.g., of the anchoring network device 106 or the network gateway system 142) can anchor at least two communication sessions via the communications interface. In some examples, each communication session can be associated with at least two terminals, e.g., terminals 302 and 304. Examples are discussed herein, e.g., with reference to SIP INVITE or other session-initiation messages. In some examples, the at least two communication sessions can include established sessions or pre-establishment sessions (e.g., at or after an initial INVITE but before a 200 OK response).

In some examples, at block 904, the control unit can receive, via the communications interface, an indication of a utilization of a plurality of transcoding units 236. The utilization can be associated with operations of transcoding, by the plurality of transcoding units, of data of at least one communication session of the at least two communication sessions. The at least one of the at least two communication sessions can include, e.g., one of the communication sessions, all of the communication sessions, or number of the communication sessions in between. Examples are discussed herein, e.g., with reference to adjustment module 234, which can receive information from utilization module 232.

In some examples, at block 906, the control unit can determine that the utilization satisfies a predetermined load criterion. Examples are discussed herein, e.g., with reference to blocks 608 and 404.

In some examples, at block 908, the control unit can adjust capability information of a first communication session of the at least two communication sessions to reduce load on the plurality of transcoding units 236. Block 908 can be performed, e.g., in response to the determination at block 906 that the utilization satisfies the predetermined load criterion ("High Load"). Examples are discussed herein, e.g., with reference to blocks 610 and 408. For example, the control unit can provide a modified INVITE to the called terminal 304.

In some examples, the utilization is associated with a predetermined time period. In some of these examples, the control unit can adjust the capability information at block 908 prior to commencement of the time period. Examples are discussed herein, e.g., with reference to block 610. This can permit managing load to mitigate the effects of sudden demand spikes.

Figure 10:
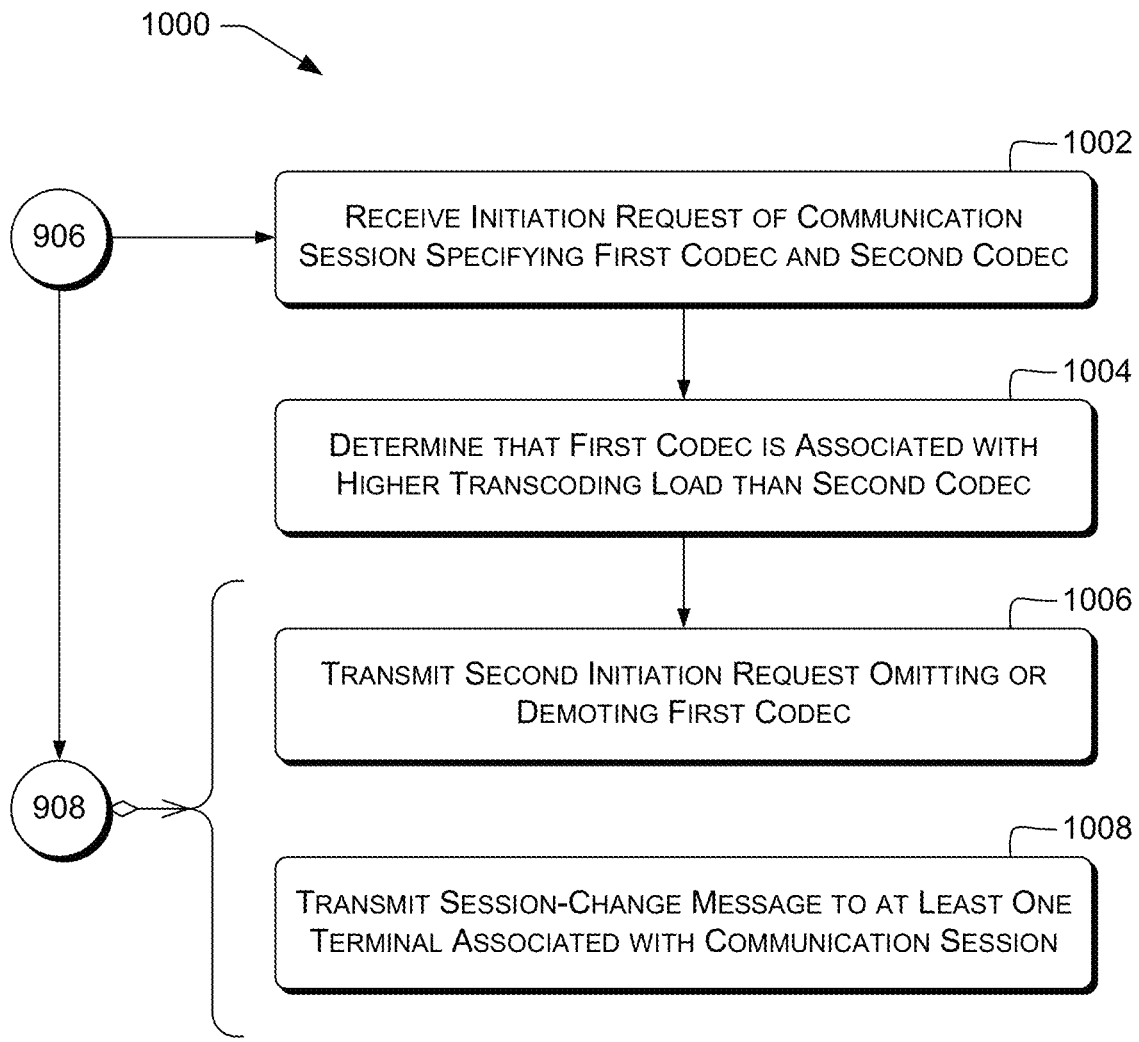
FIG. 10 illustrates an example process for interworking between two terminals. Illustrated operations can be performed by an anchoring network device, in some examples.

FIG. 10 illustrates an example process 1000 for interworking between two terminals, e.g., terminals 302 and 304. The illustrated processes can be carried out by a control unit as discussed herein with reference to FIG. 9. In some examples, block 906 can be followed by blocks 1002, 1004, or 1006, or by block 1006. In some examples, block 908 can include blocks 1006 or 1008.

In some examples, at block 1002, the control unit can receive an initiation request of the first communication session (discussed above with reference to block 908) from a first terminal associated with the first communication session. The initiation request can specify at least a first codec and a second codec. Block 1002 can be performed after determining that the utilization satisfies the predetermined load criterion (block 906) in some examples (e.g., FIGS. 3 and 4). In other examples, block 1002 can be performed before block 906, e.g., as described herein with reference to information 140. Examples of block 1002 are discussed herein, e.g., with reference to block 702.

In some examples, at block 1004, the control unit can determine that the first codec is associated with a higher transcoding load than the second codec. Examples are discussed herein, e.g., with reference to block 704.

In some examples, at block 1006, the control unit can adjust the capability information by transmitting a second initiation request to a second terminal associated with the communication session. Examples are discussed herein, e.g., with reference to block 706. In some examples, the second initiation request either omits the first codec or indicates that the second codec is preferred to the first codec. Block 1006 can be performed in response to block 906, e.g., as part of block 908. In some examples, blocks 1002 and 1004 are performed before block 908 and block 1006 is performed as part of block 908.

In some examples, at block 1008, the control unit can adjust the capability information of the first communication session by transmitting a session-change message to at least one of the at least two terminals associated with the first communication session. Examples are discussed herein, e.g., with reference to block 708.

Figure 11:
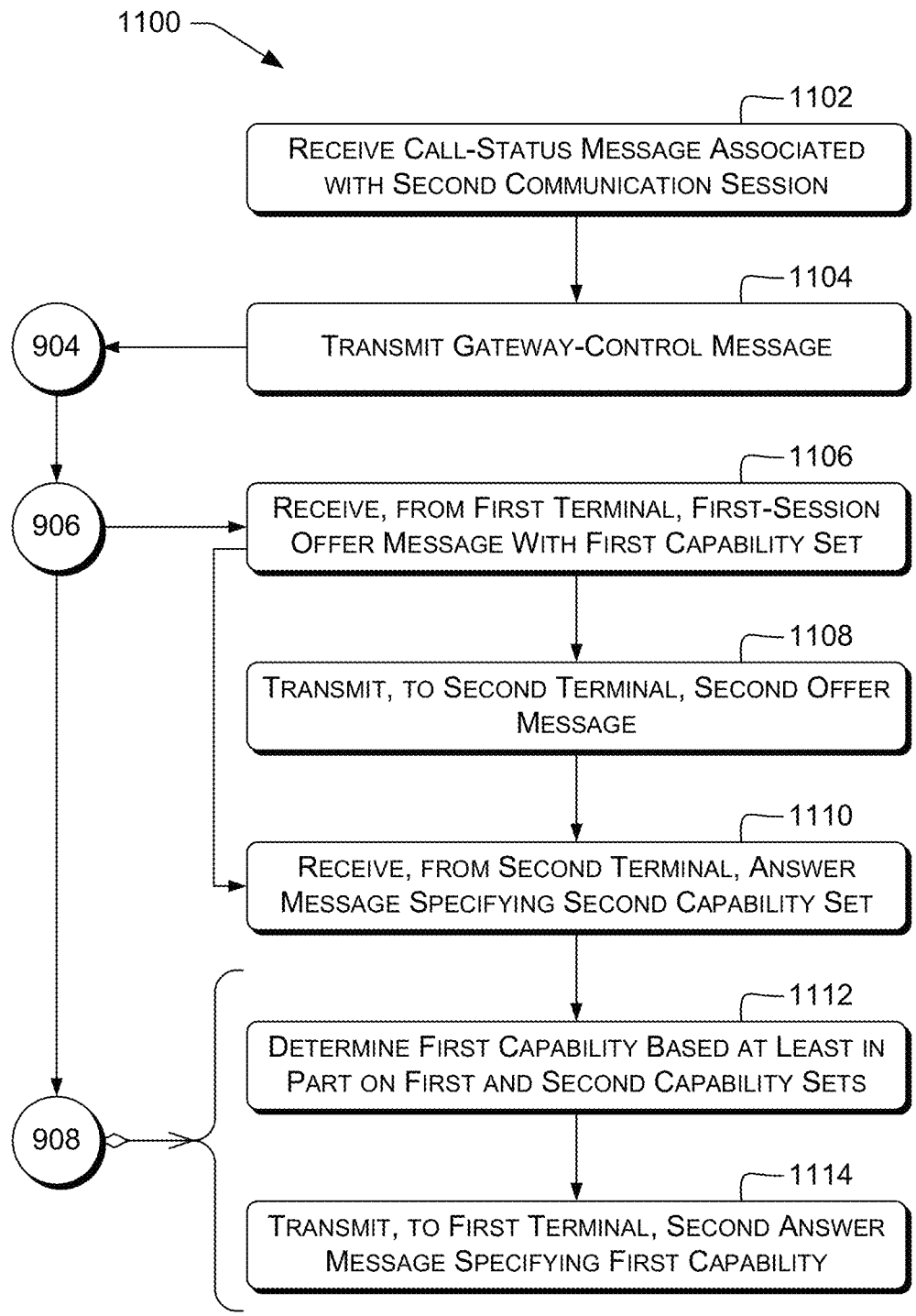
FIG. 11 illustrates an example process for interworking between two terminals, e.g., at establishment of a communication session. Illustrated operations can be performed by an anchoring network device, in some examples.

FIG. 11 illustrates an example process 1100 for interworking between two terminals, e.g., terminals 302 and 304. The illustrated processes can be carried out by a control unit as discussed herein with reference to FIG. 9. In some examples, blocks 1102 and 1104 precede block 904. In some examples, block 906 can be followed by blocks 1112 and 1114. In some examples, block 906 can be followed by blocks 1106, 1108, 1110, 1112, and 1114. In some examples, block 908 can include blocks 1112 and 1114.

In some examples, at block 1102, the control unit can receive, via the communications interface, a call-status message associated with a second communication session of the at least two communication sessions referred to at block 902. Block 1102 can be performed, e.g., before receiving the indication of the utilization at block 904.

In some examples, at block 1104, the control unit can transmit, via the communications interface, a gateway-control message. The gateway-control message can include an indication of the second communication session, e.g., to cause the network gateway 136 to take some action with respect to the indicated second communication session. The gateway-control message can also include a request for the indication of the utilization. Examples are discussed herein, e.g., with reference to information 140 or utilization module 232. Examples of processing of gateway-control messages are described herein with reference to FIGS. 13 and 14. Block 1104 can be followed by block 904.

In some examples, at block 1106, the control unit can receive an offer message of the first communication session from a first terminal associated with the first communication session, e.g., terminal 302. The offer message can be, e.g., a SIP INVITE or other session-initiation message, or a session-change message. The offer message can specify a first capability set, e.g., a codec list. In some examples, block 1106 can be followed by block 1108 or block 1110.

In some examples, at block 1108, the control unit can transmit a second offer message to a second terminal associated with the first communication session, e.g., terminal 304. In some examples of late transcoding, the second offer message does not indicate any codec specified in the offer message. Examples are discussed herein, e.g., with reference to message 312.

In some examples, at block 1110, the control unit can receive an answer message from the second terminal. For example, the answer message can include a SIP reply to an INVITE. The answer message can specify a second capability set, e.g., a codec list. Examples are discussed herein, e.g., with reference to message 314.

In some examples, at block 1112, the control unit can determine a first capability based at least in part on the first capability set and the second capability set. Block 1112 can be performed, e.g., in response to the determination at block 906 that the utilization satisfies the predetermined load criterion. Examples are discussed herein, e.g., with reference to block 316.

In some examples, the control unit can determine a common subset of the first capability set and the second capability set. The control unit can then determine the first capability from the common subset, so that the first capability is in both the first capability set and the second capability set.

Additionally or alternatively, the control unit can determine a plurality of possible transcoding operations between capabilities (e.g., codecs) in the first capability set and capabilities in the second capability set. The control unit can then select a transcoding operation meeting a predetermined criterion or criteria, e.g., the transcoding operation with the lowest cost (transcoding-unit resource usage), the operation with the highest cost below a predetermined threshold (to provide high quality where able), the operation with the median cost (to balance availability and quality), or other criteria.

In some examples, at block 1114, the control unit can transmit a second answer message to the first terminal associated with the first communication session. The second answer message can specify the first capability. Examples are discussed herein, e.g., with reference to response 318.

Figure 12:
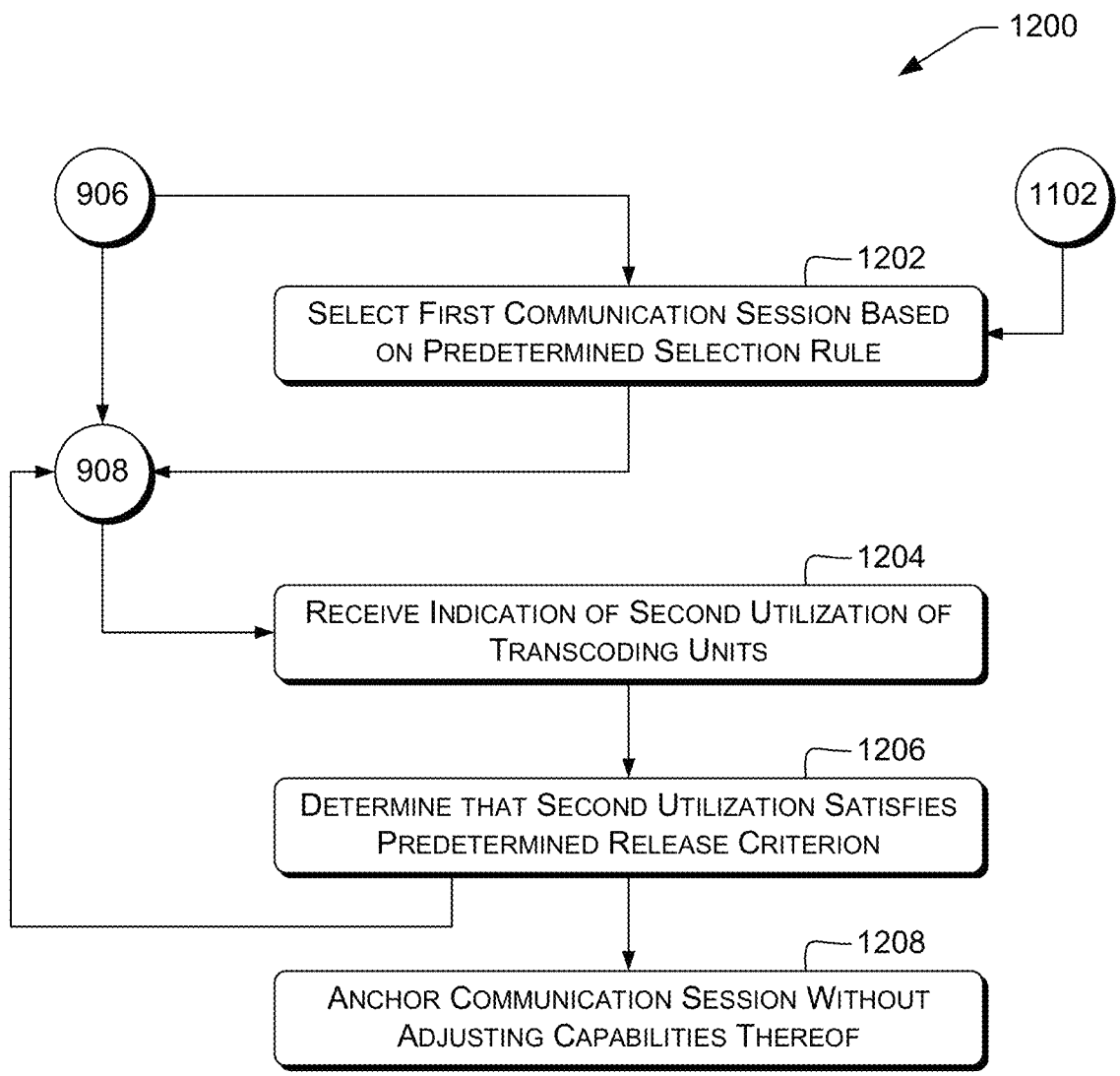
FIG. 12 illustrates an example process for interworking between two terminals. Illustrated operations can be performed by an anchoring network device, in some examples.

FIG. 12 illustrates an example process 1200 for interworking between two terminals, e.g., terminals 302 and 304. The illustrated processes can be carried out by a control unit as discussed herein with reference to FIG. 9. In some examples, block 1202 follows block 906 and precedes block 908. In some examples, block 1102 can be followed by block 1202. In some examples, block 908 can be followed by blocks 1204, 1206, and 1208. In some examples, block 1206 can be followed by block 908.

In some examples, at block 1202, the control unit can select the first communication session based at least in part on a predetermined selection rule. The first communication session is discussed above with reference to block 908. The second communication session can be different from the first communication session. The terms "first" and "second" are used merely to distinguish the sessions, and do not imply any relative order or significance.

As noted above, block 906 can be followed by block 1202. Block 1202 can be followed by block 908. Accordingly, in some examples using block 1202, the capability information of the selected first communication session can be adjusted, at block 908, to reduce load on the plurality of transcoding units 236.

In some examples using block 1102, receipt of a call-status message associated with one session can trigger adjustment of capabilities of another session. For example, receipt of a call-status message at the setup or teardown of one session can trigger adjustment in the capabilities of a different, established session. This can permit adjusting capabilities of established sessions without requiring additional call-status messages be transmitted with respect to those established sessions.

In some examples, at block 1204, the control unit can receive, via the communications interface, an indication of a second utilization of the plurality of transcoding units. For example, the indication can be carried in a gateway-control exchange, e.g., as discussed herein with reference to information 140 or blocks 306 or 1404.

In some examples, at block 1206, the control unit can determine that the second utilization of the plurality of transcoding units satisfies a predetermined release criterion. Examples are discussed herein, e.g., with reference to block 812. As noted above, this can provide hysteresis to reduce jittering of media capabilities, in some examples.

In some examples, block 1206 can be followed by block 908. This can permit adjusting other sessions in response to the determination at block 1206. Examples are discussed herein, e.g., with reference to block 812. Additionally or alternatively, block 1206 can be followed by block 1208.

In some examples, at block 1208, the control unit can, in response to the determination at block 1206, anchor a second communication session without adjusting capability information thereof. Examples are discussed herein, e.g., with reference to block 814.

Figure 13:
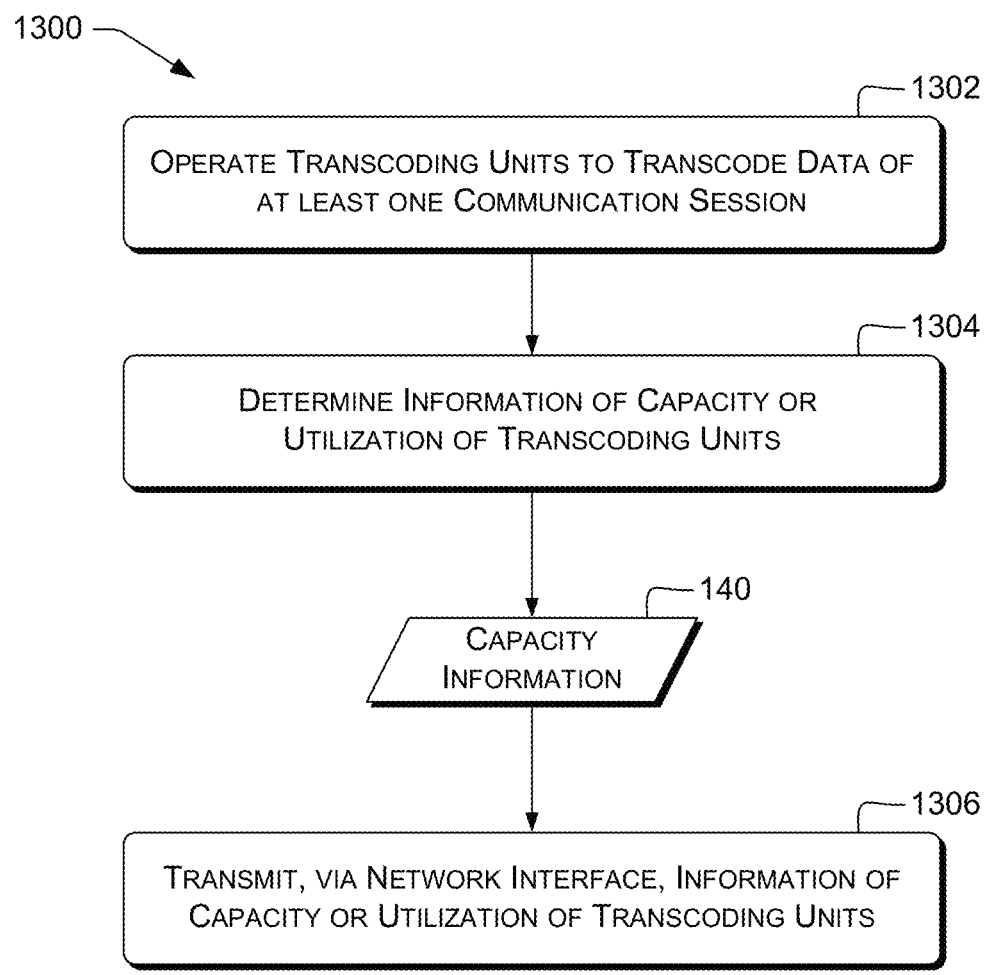
FIG. 13 illustrates an example process for interworking between two terminals. Illustrated operations can be performed by a network gateway, in some examples.

FIG. 13 illustrates an example process 1300 for interworking between two terminals, e.g., terminals 302 and 304, and associated data items. The illustrated process 1300 can be carried out by a control unit, e.g., of a network gateway 136 having a network interface 230 configured to communicate data of at least two communication sessions, and having a plurality of transcoding units 236. Additionally or alternatively, process 1300 can be carried out by components of a network gateway system 142 that are configured to interoperate with an anchoring network device 106. In some examples, the network gateway 136 (or other components noted in the preceding sentence, and likewise throughout the discussion of FIGS. 13 and 14) can include one or more processors configured to perform operations described below (or in FIG. 14), e.g., in response to computer program instructions of the utilization module 232.

In some examples, at block 1302, the control unit can operate individual transcoding units of the plurality of transcoding units 236 to transcode data of at least one of the at least two communication sessions. For example, the control unit can spawn processes, set muxes, or perform other operations to pass data of the at least one of the at least two communication sessions through the network gateway 136 via transcoding units 236 configured to perform transcoding operation(s) appropriate to the session(s).

In some examples, at block 1304, the control unit can determine information 140 of a capacity or a utilization of the plurality of transcoding units 236. Examples are discussed herein, e.g., with reference to transcoding 138 or utilization module 232.

In some examples, at block 1306, the control unit can transmit, via the network interface, the information 140 of the capacity or utilization. Examples are discussed herein, e.g., with reference to utilization module 232 or block 1404.

Figure 14:
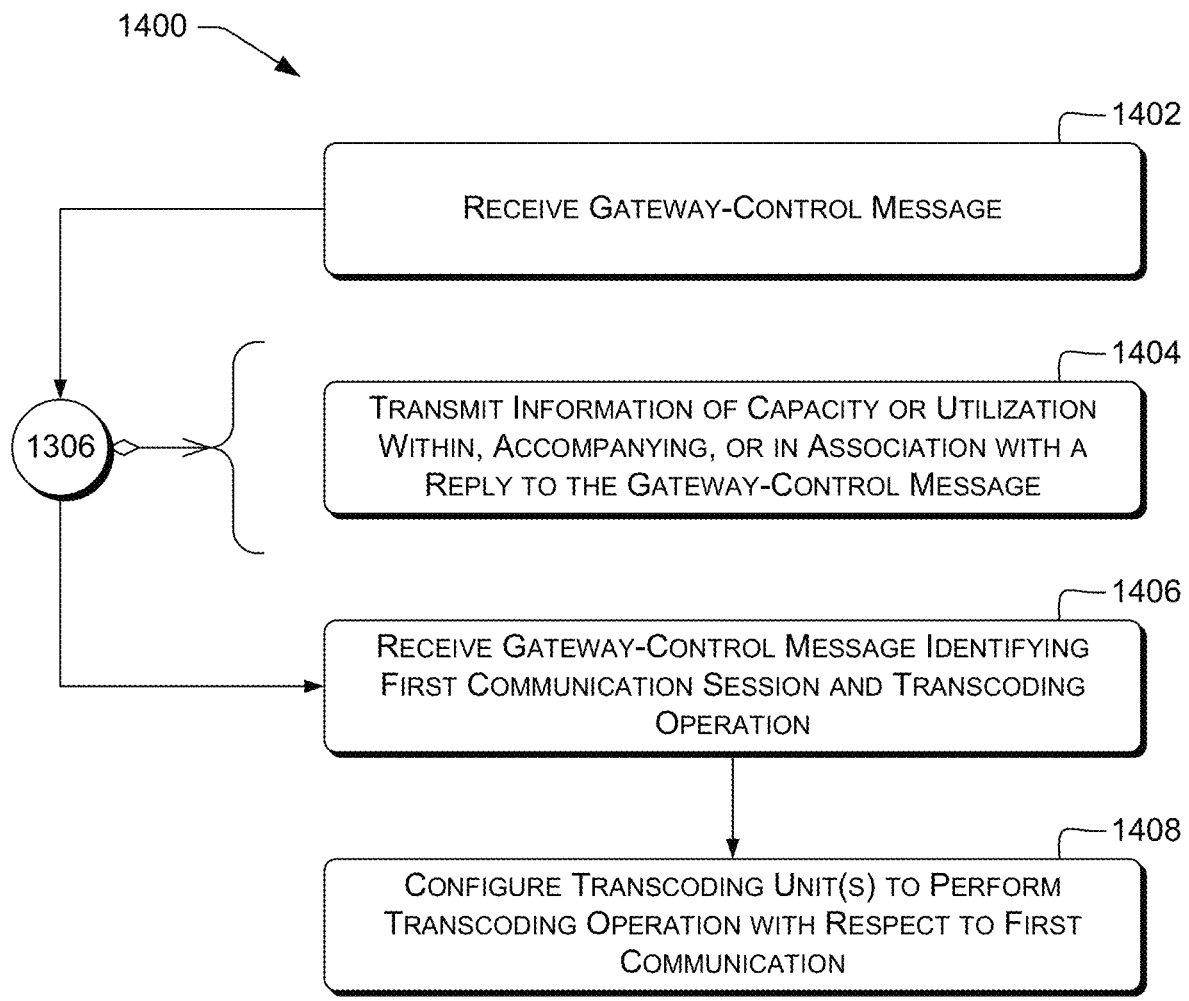
FIG. 14 illustrates an example process for controlling core-network interworking functions. Illustrated operations can be performed by a network gateway, in some examples.

FIG. 14 illustrates an example process 1400 for interworking between two terminals, e.g., terminals 302 and 304. The illustrated processes can be carried out by a network gateway as discussed herein with reference to FIG. 13. In some examples, block 1402 can precede block 1306. In some examples, block 1306 can include block 1404. In some examples, block 1306 can be followed by blocks 1406 and 1408.

In some examples, at block 1402, the control unit can receive a gateway-control message, e.g., an H.248 message. Examples are discussed herein, e.g., with reference to information 140 or block 306.

In some examples, at block 1404, the control unit can transmit the information of the capacity or the utilization within, accompanying, or in association with a reply to the gateway-control message. Examples are discussed herein, e.g., with reference to information 140, utilization module 232, or block 306. Block 1404 can be performed in response to the gateway-control message received at block 1402. As noted above, this can permit providing anchoring network device 106 with updated information 140 with reduced bandwidth usage compared to a separate transmission for information 140.

In some examples, at block 1406, the control unit can receive a gateway-control message. Block 1406 can be performed, e.g., after transmitting the information 140 at block 1306 or 1404. The gateway-control message received at block 1406 can identify a first communication session of the at least two communication sessions, e.g., an established session or a session that will shortly be transitioning to an established state. The gateway-control message can additionally identify a transcoding operation, e.g., a specific codec pair or other capability to use in the first communication session.

In some examples, at block 1408, the control unit can configure at least one transcoding unit of the plurality of transcoding units to perform the transcoding operation with respect to the first communication session identified in the gateway-control message. For example, the control unit can spawn processes, set muxes, or perform other operations to pass data of the first communication session through the network gateway 136 via transcoding units 236 configured to perform the transcoding operation, e.g., unidirectionally or bidirectionally.

Illustrative Feature Selections and Combinations

Referring to FIGS. 3, 4, and 5, in some examples, network gateway system 142 or components thereof (e.g., anchoring network device 106 or network gateway 136) can perform processing described herein with reference to FIG. 3, 4, or 5, e.g., one at a time, or per-session. For example, network gateway system 142 can use operations of one of call flows 300, 400, and 500 for some sessions and operations of a different one of call flows 300, 400, and 500 for other sessions, depending on the access networks to which the particular terminals involved in a session are connected, or on the capabilities of those terminals.

In some examples, in response to utilization meeting the criterion (blocks 308, 404, or 510), network gateway system 142 can adjust codec(s) or other capabilities used by or associated with at least one terminal. For example, network gateway system 142 can adjust capabilities of terminal 302 but not terminal 304, of terminal 304 but not terminal 302, or of both terminal 302 and terminal 304. In sessions involving more than two terminals, network gateway system 142 can adjust capabilities of at least one terminal, e.g., of one terminal, more than one but fewer than all, or all terminals in the session.

As discussed herein with reference to information 140, load processing 128 can be performed with respect to established sessions, in some examples, in addition to or instead of with respect to new sessions in the pre-establishment phase. In some examples, anchoring network device 106 can select at least one session to modify based on at least one predetermined selection rule. The selection rule can be applied, in various examples, to a candidate set comprising at least one of: all or a subset of the established sessions; all or a subset of the pre-establishment sessions; or all or a subset of both the established sessions and the pre-establishment sessions. For example, the selection rule can be at least one of: selecting randomly from the candidate set; selecting in round-robin order from the candidate set; selecting the longest-established (oldest) session in the candidate set; or selecting the shortest-established (newest) session in the candidate set.

Additionally or alternatively, the selection rule can be selecting, from the candidate set, a session that is already being renegotiated or has been selected to be renegotiated. For example, when a cellular terminal hands over from one type of access network to a different type of access network, it may need to change codecs because of the handover. Consequently, the anchoring network device 106 can control the codec change to support the new access network and to reduce transcoder load. In another example, when a call is placed on hold, its media type may change (e.g., by removing an audio stream), or its media source may change (e.g., from another party's terminal to a source of on-hold music). The anchoring network device 106 can control the codec change, or a corresponding change when the call is removed from a hold state, to reduce transcoder load. Combining load processing 128 with other session changes in this way can permit reducing transcoder load with reduced signaling bandwidth compared to sending session-change messages for load processing and separate session-change messages for other session changes.

This paragraph expressly envisions each and every combination of the listed terminal applications (e.g., one or multiple terminals in a session), candidate sets (of sessions that may be modified) and selection rules (for determining which candidate session(s) will be modified) given in the preceding three paragraphs. For example, a called terminal of the longest-established session may be selected first for modification to reduce transcoder load. When multiple sessions are to be modified to reduce transcoder load, this paragraph expressly envisions using the same combination to select at least two sessions, or using a respective, different combination to select each session, or any combination of those. For example, three different combinations can be used to select three sessions each.

Example Clauses

A: A network gateway system, comprising: a network interface; a plurality of transcoding units; and a control unit configured to: anchor at least two communication sessions via the network interface, wherein each communication session is associated with at least two terminals; operate individual transcoding units of the plurality of transcoding units to transcode data of at least one communication session of the at least two communication sessions; determine a utilization of the plurality of transcoding units; determine that the utilization satisfies a predetermined load criterion; and in response, adjust capability information of a first communication session of the at least two communication sessions to reduce load on the network gateway system.

B: The network gateway system according to paragraph A, wherein the control unit is configured to adjust the capability information of the first communication session by transmitting a session-change message to at least one of the at least two terminals associated with the first communication session.

C: The network gateway system according to paragraph A or B, wherein the session-change message comprises at least one of a Session Initiation Protocol (SIP) re-INVITE message or a SIP UPDATE message.

D: The network gateway system according to any of paragraphs A-C, wherein the control unit is configured to: receive an initiation request of the first communication session from a first terminal associated with the first communication session, the initiation request specifying at least a first codec and a second codec; determine that the first codec is associated with a higher transcoding load than the second codec; and in response to determining that the utilization satisfies the predetermined load criterion, adjust the capability information by transmitting a second initiation request to a second terminal associated with the first communication session, wherein the second initiation request either: omits the first codec; or indicates that the second codec is preferred to the first codec.

E: The network gateway system according to paragraph D, wherein the control unit is further configured to transmit the second initiation request indicating a third codec, wherein the network gateway system is configured to transcode the third codec to at least one of the first codec or the second codec.

F: The network gateway system according to any of paragraphs A-E, wherein the control unit is configured to: receive an offer message of the first communication session from a first terminal associated with the first communication session, the offer message specifying a first codec and a second codec; receive an answer message from a second terminal associated with the first communication session, the answer message specifying a third codec; determine that the first codec is associated with a higher transcoding load, with respect to the third codec, than is the second codec; and in response to determining that the utilization satisfies the predetermined load criterion, adjust the capability information by transmitting a second answer message to the first terminal associated with the first communication session, wherein the second answer message either: omits the first codec; or indicates that the second codec is preferred to the first codec.

G: The network gateway system according to paragraph F, wherein the control unit is further configured to, after receiving the offer message and before receiving the answer message, transmit a second offer message to the second terminal, the second offer message being a message that does not indicate any codec specified in the offer message.

H: The network gateway system according to any of paragraphs A-G, wherein the network gateway system is configured to permit interworking between Web Real-Time Communication (WebRTC) terminals and Long Term Evolution (LTE) terminals.

I: The network gateway system according to any of paragraphs A-H, wherein the transcoding units comprise at least one of: a digital signal processor (DSP) core or a transcoding logic unit.

J: The network gateway system according to any of paragraphs A-I, wherein: the utilization is associated with a predetermined time period; and the control unit is configured to adjust the capability information prior to commencement of the time period.

K: The network gateway system according to any of paragraphs A-J, wherein the control unit is configured to, after adjusting the capability information: determine that a second utilization of the plurality of transcoding units satisfies a predetermined release criterion; and in response, anchor a second communication session without adjusting capability information thereof.

L: An anchoring network device, comprising: a communications interface; and a control unit configured to: anchor at least two communication sessions via the communications interface, wherein each communication session is associated with at least two terminals; receive, via the communications interface, an indication of a utilization of a plurality of transcoding units, the utilization associated with transcoding by the plurality of transcoding units of data of at least one communication session of the at least two communication sessions; determine that the utilization satisfies a predetermined load criterion; and in response, adjust capability information of a first communication session of the at least two communication sessions to reduce load on the plurality of transcoding units.

M: The anchoring network device according to paragraph L, wherein the control unit is configured to adjust the capability information of the first communication session by transmitting a session-change message to at least one of the at least two terminals associated with the first communication session.

N: The anchoring network device according to paragraph L or M, wherein the control unit is further configured to, before receiving the indication of the utilization: receive, via the communications interface, a call-status message associated with a second communication session of the at least two communication sessions; and transmit, via the communications interface, a gateway-control message comprising: an indication of the second communication session; and a request for the indication of the utilization.

O: The anchoring network device according to paragraph N, wherein the control unit is further configured to select the first communication session based at least in part on a predetermined selection rule, wherein the second communication session is different from the first communication session.

P: The anchoring network device according to any of paragraphs L-O, wherein the control unit is configured to: receive an initiation request of the first communication session from a first terminal associated with the first communication session, the initiation request specifying at least a first codec and a second codec; determine that the first codec is associated with a higher transcoding load than the second codec; and in response to determining that the utilization satisfies the predetermined load criterion, adjust the capability information by transmitting a second initiation request to a second terminal associated with the first communication session, wherein the second initiation request either: omits the first codec; or indicates that the second codec is preferred to the first codec.

Q: The anchoring network device according to any of paragraphs L-P, wherein the control unit is further configured to: receive an offer message of the first communication session from a first terminal associated with the first communication session, the offer message specifying a first capability set; transmit a second offer message to a second terminal associated with the first communication session; receive an answer message from the second terminal, the answer message specifying a second capability set; determine, in response to the determining that the utilization satisfies the predetermined load criterion, a first capability based at least in part on the first capability set and the second capability set; and transmit a second answer message to the first terminal associated with the first communication session, the second answer message specifying the first capability.

R: The anchoring network device according to paragraph Q, wherein the second offer message does not indicate any codec specified in the offer message.

S: The anchoring network device according to any of paragraphs L-R, wherein: the utilization is associated with a predetermined time period; and the control unit is configured to adjust the capability information prior to commencement of the time period.

T: The anchoring network device according to any of paragraphs L-S, wherein the control unit is configured to, after adjusting the capability information: receive, via the communications interface, an indication of a second utilization of the plurality of transcoding units; determine that the second utilization of the plurality of transcoding units satisfies a predetermined release criterion; and in response, anchor a second communication session without adjusting capability information thereof.

U: The anchoring network device according to any of paragraphs L-T, wherein the control unit is configured to adjust the capability information at least in part by removing all codecs of a predetermined type from the capability information.

V: A network gateway, comprising: a plurality of transcoding units; a network interface configured to communicate data of at least two communication sessions; and a control unit configured to: operate individual transcoding units of the plurality of transcoding units to transcode data of at least one of the at least two communication sessions; determine information of a capacity or a utilization of the plurality of transcoding units; and transmit, via the network interface, the information.

W: The network gateway according to paragraph V, the control unit further configured to: receive a gateway-control message; and in response, transmit the information of the capacity or the utilization within, accompanying, or in association with a reply to the gateway-control message.

X: The network gateway according to paragraph V or W, the control unit further configured to: after transmitting the information of the capacity or the utilization, receive a gateway-control message identifying: a first communication session of the at least two communication sessions; and a transcoding operation; and configure at least one transcoding unit of the plurality of transcoding units to perform the transcoding operation with respect to the first communication session.

Y: A method comprising, by a control unit, performing operations as recited in any of paragraphs A-K.

Z: A computer-readable medium, e.g., a computer storage medium, having thereon computer-executable instructions, the computer-executable instructions upon execution configuring a computer to perform operations as any of paragraphs A-K recites.

AA: A system comprising: means for processing; and means for storing having thereon computer-executable instructions, the computer-executable instructions including means to configure the system to carry out a method as any of paragraphs A-K recites.

AB: A method comprising, by a control unit, performing operations as recited in any of paragraphs L-U.

AC: A computer-readable medium, e.g., a computer storage medium, having thereon computer-executable instructions, the computer-executable instructions upon execution configuring a computer to perform operations as any of paragraphs L-U recites.

AD: A system comprising: means for processing; and means for storing having thereon computer-executable instructions, the computer-executable instructions including means to configure the system to carry out a method as any of paragraphs L-U recites.

AE: A method comprising, by a control unit, performing operations as recited in any of paragraphs V-X.

AF: A computer-readable medium, e.g., a computer storage medium, having thereon computer-executable instructions, the computer-executable instructions upon execution configuring a computer to perform operations as any of paragraphs V-X recites.

AG: A system comprising: means for processing; and means for storing having thereon computer-executable instructions, the computer-executable instructions including means to configure the system to carry out a method as any of paragraphs V-X recites.

Conclusion

In the figures, example data transmissions (parallelograms), example data exchanges in call flow diagrams, and example blocks in process diagrams represent one or more operations that can be implemented in hardware, software, or a combination thereof to transmit or receive described data or conduct described exchanges. In the context of software, the illustrated blocks and exchanges represent computer-executable instructions that, when executed by one or more processors, cause the processors to transmit or receive the recited data. Generally, computer-executable instructions, e.g., stored in program modules that define operating logic, include routines, programs, objects, modules, components, data structures, and the like that perform particular functions or implement particular abstract data types. Except as expressly set forth herein, the order in which the transmissions are described is not intended to be construed as a limitation, and any number of the described transmissions can be combined in any order and/or in parallel to implement the processes.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," and/or any of those phrases with "and/or" substituted for "or," unless specifically stated otherwise, is to be understood as signifying that an item, term, etc., can be either X, or Y, or Z, or a combination of any elements thereof (e.g., a combination of XY, XZ, YZ, and/or XYZ). Any use herein of phrases such as "X, or Y, or both" is for clarity of explanation and does not imply that language such as "X or Y" excludes the possibility of both X and Y, unless such exclusion is expressly stated. As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

Furthermore, although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims. Moreover, in the claims, any reference to a group of items provided by a preceding claim clause is a reference to at least some of the items in the group of items, unless specifically stated otherwise.

What is claimed is:

1. A network gateway system, comprising:
   a network interface;
   a plurality of transcoding units configured to transcode data between at least two codecs; and
   a control unit configured to:
      anchor at least two communication sessions via the network interface, wherein a first communication session of the at least two communication sessions is associated with at least two terminals;
      operate individual transcoding units of the plurality of transcoding units to transcode data of the first communication session between the at least two codecs associated with the at least two terminals;
      determine, based at least on a transcoding load associated with the plurality of transcoding units, a utilization of the plurality of transcoding units, wherein the transcoding load comprises a transcoding resource density associated with the at least two codecs of the first communication session that indicates a number of transcoding units available for the at least two codecs;
      determine that the utilization satisfies a predetermined load criterion associated with the plurality of transcoding units;
      generate, based at least on the utilization satisfying the predetermined load criterion, an updated codec list that identifies permitted codecs for the plurality of transcoding units; and
      adjust, based at least on the updated codec list, capability information of the first communication session to reduce a load on the network gateway system by modifying the at least two codecs associated with the first communication session.

2. The network gateway system according to claim 1, wherein the control unit is configured to adjust the capability information of the first communication session by transmitting a session-change message to at least one of the at least two terminals associated with the first communication session.

3. The network gateway system according to claim 2, wherein the session-change message comprises at least one of a Session Initiation Protocol (SIP) re-INVITE message or a SIP UPDATE message.

4. The network gateway system according to claim 1, wherein the control unit is configured to:
   receive an initiation request of the first communication session from a first terminal associated with the first communication session, the initiation request specifying at least a first codec and a second codec;

determine that the first codec is associated with a higher transcoding load than the second codec; and in response to determining that the utilization satisfies the predetermined load criterion, adjust the capability information by transmitting a second initiation request to a second terminal associated with the first communication session, wherein the second initiation request either:

omits the first codec; or indicates that the second codec is preferred to the first codec.

5. The network gateway system according to claim 4, wherein the control unit is further configured to transmit the second initiation request indicating a third codec, wherein the network gateway system is configured to transcode the third codec to at least one of the first codec or the second codec.

6. The network gateway system according to claim 1, wherein the control unit is configured to:

receive an offer message of the first communication session from a first terminal associated with the first communication session, the offer message specifying a first codec and a second codec;

receive an answer message from a second terminal associated with the first communication session, the answer message specifying a third codec;

determine that the first codec is associated with a higher transcoding load, with respect to the third codec, than is the second codec; and in response to determining that the utilization satisfies the predetermined load criterion, adjust the capability information by transmitting a second answer message to the first terminal associated with the first communication session, wherein the second answer message either:

omits the first codec; or indicates that the second codec is preferred to the first codec.

7. The network gateway system according to claim 6, wherein the control unit is further configured to, after receiving the offer message and before receiving the answer message, transmit a second offer message to the second terminal, wherein the second offer message does not indicate any codec specified in the offer message.

8. The network gateway system according to claim 1, wherein the network gateway system is configured to permit interworking between Web Real-Time Communication (WebRTC) terminals and Long Term Evolution (LTE) terminals.

9. The network gateway system according to claim 1, wherein the transcoding units comprise at least one of: a digital signal processor (DSP) core or a transcoding logic unit.

10. The network gateway system according to claim 1, wherein:

the utilization is associated with a predetermined time period; and the control unit is configured to adjust the capability information prior to commencement of the predetermined time period.

11. An anchoring network device, comprising:

a communications interface; and a control unit configured to:

anchor at least two communication sessions via the communications interface, wherein each communication session is associated with at least two terminals;

receive, via the communications interface, an indication of a utilization of a plurality of transcoding units, wherein the utilization is associated with transcoding, by the plurality of transcoding units, of data from at least one a first communication session of the at least two communication sessions between at least two codecs associated with the at least two terminals;

determine, based at least on a transcoding load associated with the plurality of transcoding units, that the utilization satisfies a predetermined load criterion associated with the plurality of transcoding units, wherein the transcoding load comprises a transcoding resource density associated with the at least two codecs of the first communication session that indicates a number of transcoding units available for the at least two codecs; and in response to determining that the utilization satisfies the predetermined load criterion:

generate, based at least on the utilization satisfying the predetermined load criterion, an updated codec list that identifies permitted codecs for the plurality of transcoding units; and adjust capability information of a first communication session of the at least two communication sessions to reduce a load on the plurality of transcoding units.

12. The anchoring network device according to claim 11, wherein the control unit is configured to adjust the capability information of the first communication session by transmitting a session-change message to at least one of the at least two terminals associated with the first communication session.

13. The anchoring network device according to claim 11, wherein the control unit is further configured to, before receiving the indication of the utilization:

receive, via the communications interface, a call-status message associated with a second communication session of the at least two communication sessions; and transmit, via the communications interface, a gateway-control message comprising:

an indication of the second communication session; and a request for the indication of the utilization.

14. The anchoring network device according to claim 13, wherein the control unit is further configured to select the first communication session based at least in part on a predetermined selection rule, wherein the second communication session is different from the first communication session.

15. The anchoring network device according to claim 11, wherein the control unit is configured to:

receive an initiation request of the first communication session from a first terminal associated with the first communication session, the initiation request specifying at least a first codec and a second codec;

determine that the first codec is associated with a higher transcoding load than the second codec; and in response to determining that the utilization satisfies the predetermined load criterion, adjust the capability information by transmitting a second initiation request to a second terminal associated with the first communication session, wherein the second initiation request either:

omits the first codec; or indicates that the second codec is preferred to the first codec.

16. The anchoring network device according to claim 11, wherein the control unit is further configured to:
- receive an offer message of the first communication session from a first terminal associated with the first communication session, the offer message specifying a first capability set;
- transmit a second offer message to a second terminal associated with the first communication session;
- receive an answer message from the second terminal, the answer message specifying a second capability set;
- determine, in response to the determining that the utilization satisfies the predetermined load criterion, a first capability based at least in part on the first capability set and the second capability set; and
- transmit a second answer message to the first terminal associated with the first communication session, the second answer message specifying the first capability.

17. The anchoring network device according to claim 11, wherein the control unit is configured to, after adjusting the capability information:
- receive, via the communications interface, an indication of a second utilization of the plurality of transcoding units;
- determine that the second utilization of the plurality of transcoding units satisfies a predetermined release criterion; and
- in response, anchor a second communication session without adjusting capability information thereof.

18. A network gateway, comprising:
- a plurality of transcoding units configured to transcode data between at least two codecs;
- a network interface configured to communicate data of at least two communication sessions; and
- a control unit configured to:
  - operate individual transcoding units of the plurality of transcoding units to transcode data of at least one of the at least two communication sessions between the at least two codecs associated with the at least two communication sessions;
  - determine, based at least on a transcoding load associated with the plurality of transcoding units, a utilization of the plurality of transcoding units, wherein the transcoding load comprises a transcoding resource density associated with the at least two communication sessions that indicates a number of transcoding units available for the at least two codecs;
  - determine that the utilization satisfies a predetermined load criterion associated with the plurality of transcoding units;
  - generate, based at least on the utilization satisfying the predetermined load criterion, an updated codec list that identifies permitted codecs for the plurality of transcoding units and
  - transmit, via the network interface, the updated codec list and information regarding the utilization.

19. The network gateway according to claim 18, the control unit further configured to:
- receive a gateway-control message; and
- in response to receiving the gateway-control message, transmit the information of the capacity or the utilization within, accompanying, or in association with a reply to the gateway-control message.

20. The network gateway according to claim 18, the control unit further configured to:
- after transmitting the information of the capacity or the utilization, receive a gateway-control message identifying:
  - a first communication session of the at least two communication sessions; and
  - a transcoding operation; and
- configure at least one transcoding unit of the plurality of transcoding units to perform the transcoding operation with respect to the first communication session.

* * * * *